United States Patent
Li et al.

(10) Patent No.: US 11,071,143 B2
(45) Date of Patent: Jul. 20, 2021

(54) DATA SENDING METHOD AND USER EQUIPMENT

(71) Applicant: Huawei Technologies Co., Ltd., Shenzhen (CN)

(72) Inventors: Xiaocui Li, Beijing (CN); Kai Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 32 days.

(21) Appl. No.: 16/488,804

(22) PCT Filed: Jun. 12, 2017

(86) PCT No.: PCT/CN2017/087882
§ 371 (c)(1),
(2) Date: Aug. 26, 2019

(87) PCT Pub. No.: WO2018/152985
PCT Pub. Date: Aug. 30, 2018

(65) Prior Publication Data
US 2020/0236708 A1  Jul. 23, 2020

(30) Foreign Application Priority Data

Feb. 27, 2017  (CN) .......................... 201710109477.7

(51) Int. Cl.
*H04W 74/08* (2009.01)
*H04L 5/00* (2006.01)
*H04W 72/04* (2009.01)

(52) U.S. Cl.
CPC ....... *H04W 74/0808* (2013.01); *H04L 5/0053* (2013.01); *H04W 72/042* (2013.01); *H04W 72/0446* (2013.01); *H04W 72/0453* (2013.01)

(58) Field of Classification Search
CPC ........... H04W 74/0808; H04W 72/042; H04W 72/0446; H04W 72/0453; H04W 16/14;
(Continued)

(56) References Cited

U.S. PATENT DOCUMENTS

| 2009/0207747 A1 | 8/2009 | Kim et al. |
| 2011/0103352 A1 | 5/2011 | Wentink |

(Continued)

FOREIGN PATENT DOCUMENTS

| CN | 105379399 A | 3/2016 |
| CN | 106453181 A | 2/2017 |

(Continued)

OTHER PUBLICATIONS

Foreign Communication From a Counterpart Application, European Application No. 17897875.5, Extended European Search Report dated Dec. 16, 2019, 10 pages.

(Continued)

*Primary Examiner* — Ricky Q Ngo
*Assistant Examiner* — Michael K Phillips
(74) *Attorney, Agent, or Firm* — Conley Rose, P.C.

(57) ABSTRACT

A data sending method includes determining, by user equipment, a narrowband time-frequency resource scheduled by a base station. The method further includes performing, by the user equipment, clear channel assessment CCA channel detection on the narrowband time-frequency resource to obtain a channel energy value of the narrowband time-frequency resource. The method further includes determining, by the user equipment, whether the channel energy value is less than a preset energy threshold. When the channel energy value is less than the preset energy threshold, the method includes sending, by the user equipment, uplink data to the base station on the narrowband time-frequency resource.

20 Claims, 10 Drawing Sheets

(58) Field of Classification Search
CPC ... H04W 74/0816; H04W 4/70; H04W 72/04; H04W 52/18; H04L 5/0053
See application file for complete search history.

(56) References Cited

U.S. PATENT DOCUMENTS

| | | | |
|---|---|---|---|
| 2014/0362780 A1 | 12/2014 | Malladi et al. | |
| 2015/0009907 A1 | 1/2015 | Merlin et al. | |
| 2016/0316374 A1* | 10/2016 | Xu | H04W 74/0816 |
| 2017/0094683 A1 | 3/2017 | Sun et al. | |
| 2017/0150523 A1* | 5/2017 | Patel | H04W 74/008 |
| 2017/0332440 A1* | 11/2017 | Xu | H04L 67/104 |
| 2018/0069589 A1* | 3/2018 | Liu | H04B 7/2634 |
| 2018/0070369 A1* | 3/2018 | Papasakellariou | H04W 16/14 |
| 2018/0110057 A1 | 4/2018 | Park et al. | |
| 2018/0124790 A1* | 5/2018 | Yerramalli | H04W 16/14 |
| 2018/0242372 A1 | 8/2018 | Yang et al. | |
| 2018/0310332 A1 | 10/2018 | Ahn et al. | |
| 2019/0037601 A1* | 1/2019 | Noh | H04L 27/0006 |

FOREIGN PATENT DOCUMENTS

| | | | | |
|---|---|---|---|---|
| CN | 107733616 A * | 2/2018 | ......... | H04W 72/087 |
| EP | 3357183 | 8/2018 | | |
| EP | 3357183 A1 * | 8/2018 | ............ | H04L 27/00 |
| WO | 2012106843 A1 | 8/2012 | | |
| WO | 2016072685 A2 | 5/2016 | | |
| WO | 2016167623 A1 | 10/2016 | | |

OTHER PUBLICATIONS

Qualcomm Incorporated, "UL Channel Access for eLAA," R1-164415, 3GPP TSG RAN WG1 #85, Nanjing, China, May 23-27, 2016, 3 pages.

Huawei, et al., "WF on PUSCH resource allocation for eLAA," R1-165800, WF on PUSCH resource allocation for eLAA, Nanjing, China, May 23-27, 2016, 5 pages.

Ericsson, et al., "Study on LTE Evolution for Unlicensed Spectrum Deployments" RP-131788, 3GPP TSG RAN Meeting #62, Nov. 26, 2013, 6 pages.

"3rd Generation Partnership Project; Technical Specification Group Radio Access Network; Study on Licensed-Assisted Access to Unlicensed Spectrum; (Release 13)," 3GPP TR 36.889, V13.0.0, Jun. 2015, 285 pages.

"3rd Generation Partnership Project; Technical Specification Group Radio Access Network; Evolved Universal Terrestrial Radio Access (E-UTRA); Physical channels and modulation (Release 13)," 3GPP TS 36.211, V13.2.0, Jun. 2016, 168 pages.

"Broadband Radio Access Networks (BRAN); 5 GHz high performance RLAN; Harmonized EN covering the essential requirements of article 3.2 of the R&TTE Directive," Final draft ETSI EN 301 893, V1.8.0, Jan. 2015, 93 pages.

Foreign Communication From A Counterpart Application, PCT Application No. PCT/CN2017/087882, English Translation of International Search Report dated Nov. 15, 2017, 2 pages.

Foreign Communication From A Counterpart Application, PCT Application No. PCT/CN2017/087882, English Translation of Written Opinion dated Nov. 15, 2017, 4 pages.

* cited by examiner

DATA SENDING METHOD AND USER EQUIPMENT

CROSS-REFERENCE TO RELATED APPLICATIONS

This application is a National Stage of International Application No. PCT/CN2017/087882, filed on Jun. 12, 2017, which claims priority to Chinese Patent Application No. 201710109477.7, filed on Feb. 27, 2017, both of which are hereby incorporated by reference in their entireties.

TECHNICAL FIELD

This application relates to the communications field, and in particular, to a data sending method and user equipment.

BACKGROUND

In eLAA, to ensure friendly coexistence of an LTE base station and a Wi-Fi AP at an unlicensed frequency band, an eLAA system uses, in uplink and downlink directions, technologies such as LBT, CCA-ED, and discontinuous transmission that are inherited from an 802.11 system. Uplink resource allocation in the eLAA system needs to comply with a minimum channel occupation percentage specified by ETSI for each sending node; therefore, 3GPP specifies that an interlace structure is used during uplink-resource allocation of UE.

For example, a bandwidth is 20 MHz; then 100 RBs (Resource Block, resource block) are evenly divided into 10 interlaces, with each interlace including 10 RBs, and the RBs are evenly distributed within entire communication bandwidth, as shown in FIG. 1. When scheduling an uplink resource for UE, a base station may choose to allocate one or more interlaces. Both an LBT mechanism and a CCA-ED mechanism that are currently applied to a Wi-Fi system and an eLAA communications system are full-bandwidth detection mechanisms in time domain.

However, The prior art has the following disadvantages:

Because UE uses NR (New Radio) frequency division multiplexing in UL, UEs in a same cell for which different interlace resources are scheduled may perform transmission in a same subframe, and different UEs may differ in deferral duration. If data is sent immediately after deferral ends, due to full-bandwidth CCA detection used, UE on which deferral does not end may be blocked by UE that sends data, causing an uplink data sending failure and a spectrum resource waste. If UEs send data in a same symbol start position, an idle channel may exist before UE on which deferral ends first sends data, and the channel may be easily preempted by a Wi-Fi node. Consequently, although detection succeeds, channel access fails. Therefore, the full-bandwidth LBT mechanism and the full-bandwidth CCA mechanism are adverse to frequency division multiplexing for UE in an uplink direction. This most possibly reduces uplink spectrum utilization efficiency and increases an uplink communication delay.

SUMMARY

Embodiments of this application provide a data sending method and user equipment, to increase uplink time-frequency resource utilization.

A first aspect of the embodiments of this application provides a data sending method, where the method includes: determining, by user equipment, a narrowband time-frequency resource scheduled by a base station, where there are a plurality of types of narrowband time-frequency resources, for example, the narrowband time-frequency resource may be an interlace; performing, by the user equipment, CCA channel detection on the narrowband time-frequency resource to obtain a channel energy value of the narrowband time-frequency resource, where the channel energy value of the narrowband time-frequency resource can indicate an occupancy status of the narrowband time-frequency resource; and determining, by the user equipment, whether the channel energy value is less than a preset energy threshold; and if the channel energy value is less than the preset energy threshold, which indicates that the narrowband time-frequency resource is idle currently, sending, by the user equipment, uplink data to the base station on the narrowband time-frequency resource.

When the channel energy value obtained by the user equipment by performing CCA channel detection on the narrowband time-frequency resource scheduled for the user equipment is less than the preset energy threshold, it indicates that the narrowband time-frequency resource is idle, and the uplink data can be sent. An opportunity of accessing a channel by the user equipment can be increased in a manner of performing CCA channel detection on the narrowband time-frequency resource, thereby increasing uplink time-frequency resource utilization.

With reference to the first aspect of the embodiments of this application, in a first implementation of the first aspect of the embodiments of this application, before the sending, by the user equipment, uplink data to the base station on the narrowband time-frequency resource, the method in this implementation further includes: sending, by the user equipment, a reservation signal before reaching a preset symbol boundary of the narrowband time-frequency resource, to occupy the narrowband time-frequency resource. This can prevent another node from preempting the narrowband time-frequency resource.

Correspondingly, the sending, by the user equipment, uplink data to the base station on the narrowband time-frequency resource includes: starting, by the user equipment, to send the uplink data to the base station at the preset symbol boundary of the narrowband time-frequency resource. That is, the user equipment sends the uplink data to the base station after sending the reservation signal on the narrowband time-frequency resource.

By sending the reservation signal, the user equipment occupies, before sending the uplink data to the base station, the narrowband time-frequency resource scheduled for the user equipment, preventing another node in a communications network from occupying the narrowband time-frequency resource.

With reference to the first aspect of the embodiments of this application, in a second implementation of the first aspect of the embodiments of this application, the narrowband time-frequency resource includes a subframe; and the performing, by the user equipment, CCA channel detection on the narrowband time-frequency resource includes: performing, by the user equipment, CCA channel detection within a detection window of the narrowband time-frequency resource, where the detection window is a preset position in the subframe. The detection window is set, so that the user equipment performs CCA channel detection in a specified location. Characteristics of different positions on a channel resource may differ, leading to different effects of CCA channel detection. Performing CCA channel detection in a preset position of a subframe can meet different detection requirements.

With reference to the second implementation of the first aspect of the embodiments of this application, in a third implementation of the first aspect of the embodiments of this application, the narrowband time-frequency resource includes a subframe, and the detection window is a position of the last symbol in the $N^{th}$ subframe and/or a position of the $1^{st}$ symbol in the $(N+1)^{th}$ subframe of the narrowband time-frequency resource, where N is a positive integer. In a position of the $1^{st}$ symbol of a subframe and a position of the last symbol of the subframe, there is a relatively high probability that a channel is idle. In this case, after the position of the last symbol in the $N^{th}$ subframe and/or the position of the $1^{st}$ symbol in the $(N+1)^{th}$ subframe of the narrowband time-frequency resource are used to form the detection window, the user equipment performs CCA channel detection on the detection window, and a probability that an idle channel is detected is relatively high, thereby increasing an opportunity of accessing a channel by the user equipment.

With reference to the second implementation of the first aspect of the embodiments of this application, in a fourth implementation of the first aspect of the embodiments of this application, the detection window is a position of a preset symbol of a subframe, and the preset symbol includes a plurality of detection position points; and in this case, the performing, by the user equipment, CCA channel detection within a detection window of the narrowband time-frequency resource includes: performing, by the user equipment, CCA channel detection at the plurality of detection position points. The detection position points are set, so that the user equipment performs CCA channel detection at the detection position points. This can achieve a relatively good detection effect without performing detection continuously, reducing power consumption.

With reference to the second implementation of the first aspect of the embodiments of this application, in a fifth implementation of the first aspect of the embodiments of this application, before the sending, by the user equipment, uplink data to the base station on the narrowband time-frequency resource, the method in this implementation further includes: sending, by the user equipment, a reservation signal before reaching a preset symbol boundary of the narrowband time-frequency resource, to occupy the narrowband time-frequency resource. This can prevent another node from preempting the narrowband time-frequency resource.

Correspondingly, the sending, by the user equipment, uplink data to the base station on the narrowband time-frequency resource includes: starting, by the user equipment, to send the uplink data to the base station at the preset symbol boundary of the narrowband time-frequency resource.

By sending the reservation signal, the user equipment occupies, before sending the uplink data to the base station, the narrowband time-frequency resource scheduled for the user equipment, preventing another node in a communications network from occupying the narrowband time-frequency resource.

With reference to any one of the second to the fifth implementations of the first aspect of the embodiments of this application, in a sixth implementation of the first aspect of the embodiments of this application, the determining, by user equipment, a narrowband time-frequency resource scheduled by a base station includes: obtaining, by the user equipment, control information sent by the base station, where the control information is used to indicate, to the user equipment, the narrowband time-frequency resource scheduled by the base station, and the control information may be, for example, a UL grant. By using the control information, the user equipment can learn of the narrowband time-frequency resource scheduled for the user equipment by the base station.

Before the performing, by the user equipment, CCA channel detection within a detection window of the narrowband time-frequency resource, the method in this implementation further includes: determining, by the user equipment, whether a preset quantity of pieces of control information are obtained continuously and a channel cannot be accessed; and if the preset quantity of pieces of control information are obtained continuously and a channel cannot be accessed, performing, by the user equipment, the step of performing CCA channel detection within a detection window of the narrowband time-frequency resource.

If the user equipment obtains the preset quantity of pieces of control information continuously and a channel cannot be accessed, it indicates that the user equipment is interfered with by edge UE in a neighboring cell, resulting in a channel access failure. To increase a channel access opportunity, the user equipment can perform narrowband CCA channel detection at the detection window.

With reference to the sixth implementation of the first aspect of the embodiments of this application, in a seventh implementation of the first aspect of the embodiments of this application, if the channel energy value is less than the preset energy threshold, the method in this implementation further includes: sending, by the user equipment, acknowledgment information to the base station on the narrowband time-frequency resource, so that triggered by the acknowledgment information, the base station adjusts downlink power allocation for the user equipment. By sending the acknowledgment information, the user equipment notifies the base station that the user equipment is interfered with by edge UE in a neighboring cell. To improve downlink communication quality of the user equipment, the base station can adjust downlink power allocation on the user equipment, for example, increasing a reference-signal sending power.

With reference to any one of the first aspect or the first to the fifth implementations of the first aspect of the embodiments of this application, in an eighth implementation of the first aspect of the embodiments of this application, the narrowband time-frequency resource is an interlace.

According to a second aspect, an embodiment of this application provides user equipment, where the user equipment has functions of the user equipment in the foregoing method. The functions may be implemented by using hardware or by executing corresponding software by hardware. The hardware or software includes one or more modules corresponding to the functions.

In a possible implementation, the user equipment includes:

a determining unit, configured to determine a narrowband time-frequency resource scheduled by a base station;

a detection unit, configured to perform clear channel assessment CCA channel detection on the narrowband time-frequency resource to obtain a channel energy value of the narrowband time-frequency resource;

a judgment unit, configured to determine whether the channel energy value is less than a preset energy threshold; and a sending unit, configured to: if the channel energy value is less than the preset enemy threshold, send uplink data to the base station on the narrowband time-frequency resource.

In another possible implementation, the user equipment includes:

a transceiver and a processor, where the processor performs the following action: determining a narrowband time-frequency resource scheduled by the base station;

the processor performs the following action: performing clear channel assessment CCA channel detection on the narrowband time-frequency resource to obtain a channel energy value of the narrowband time-frequency resource;

the processor performs the following action: determining whether the channel energy value is less than a preset energy threshold; and the transceiver performs the following action: if the channel energy value is less than the preset energy threshold, sending uplink data to the base station on the narrowband time-frequency resource.

According to a third aspect, an embodiment of this application provides a computer storage medium, where the computer storage medium stores program code, and the program code is used to instruct to execute the method in the first aspect.

Another aspect of this application provides a computer readable storage medium, where the computer readable storage medium store an instruction, and running of the computer readable storage medium on the computer causes the computer to perform the method in the aspects.

Another aspect of this application provides a computer program product including an instruction, and running of the computer program product on a computer causes the computer to perform the method in the aspects.

In the technical solutions provided in the embodiments of this application, after determining the narrowband time-frequency resource scheduled by the base station, the user equipment performs CCA channel detection on the narrowband time-frequency resource to obtain the channel energy value of the narrowband time-frequency resource. Then the user equipment determines whether the channel energy value is less than the preset energy threshold; and if the channel energy value is less than the preset energy threshold, the user equipment sends the uplink data to the base station on the narrowband time-frequency resource.

The base station schedules the narrowband time-frequency resource for the user equipment, so that the user equipment sends the uplink data on the narrowband time-frequency resource. Different user equipments may perform data transmission on different narrowband time-frequency resources. In this case, the user equipment performs CCA channel detection on the narrowband time-frequency resource scheduled for the user equipment, and when the detected channel energy value is less than the preset energy threshold, it indicates that the narrowband time-frequency resource is idle, and the uplink data can be sent. When a narrowband time-frequency resource scheduled for one user equipment is idle and there is data transmitted on another narrowband time-frequency resource of the same subframe, a channel access failure may be caused if the user equipment uses full-bandwidth CCA channel detection. In this way, an opportunity of accessing a channel by the user equipment can be increased in a manner of performing CCA channel detection on the narrowband time-frequency resource, thereby increasing uplink time-frequency resource utilization.

DESCRIPTION OF EMBODIMENTS

In the specification, claims, and accompanying drawings of this application, terms "first", "second", "third", "fourth", and so on (if existent) are intended to distinguish between similar objects, but do not necessarily indicate a specific order or sequence. It should be understood that the data termed in such a way are interchangeable in proper circumstances so that the embodiments described herein can be implemented in an order different from the order illustrated or described herein. Moreover, the terms "include", "comprise", and any other variants are intended to cover the non-exclusive inclusion, for example, a process, method, system, product, or device that includes a list of steps or units is not necessarily limited to those units, but may include other units not expressly listed or inherent to such a process, method, system, product, or device.

Figure 1:
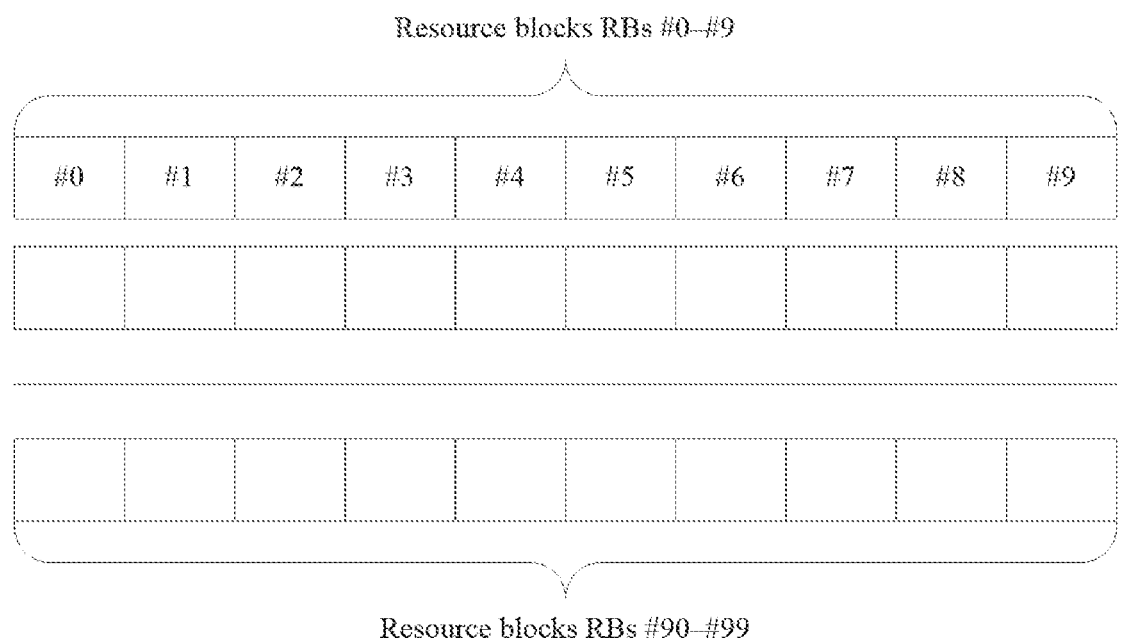
FIG. 1 is a schematic diagram of uplink resource distribution according to an embodiment of this application.
Figure 2:
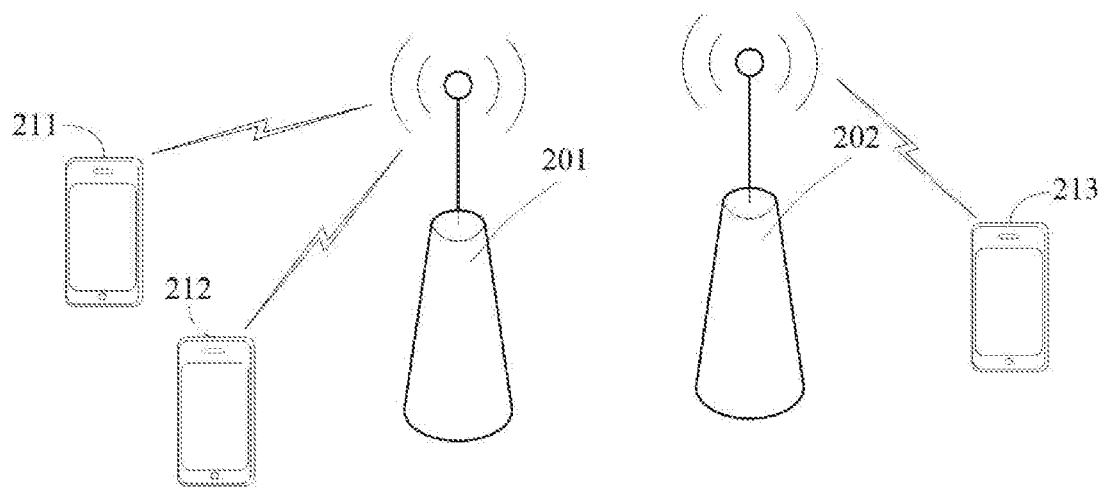
FIG. 2 is a diagram of a network architecture according to another embodiment of this application.

FIG. 2 is a diagram of a network architecture according to an embodiment of this application. The network architecture includes a base station 201, a plurality of user equipments, and a (Wireless-Fidelity, Wireless Fidelity) node 202. The base station 201 and the Wi-Fi node can perform data scheduling and transmission at an unlicensed frequency band, UE (User Equipment, user equipment) 211 and user equipment 212 can transmit data on a time-frequency resource scheduled by the base station 201. User equipment 213 and the Wi-Fi node perform interactive data transmission. The plurality of user equipments include but are not limited to devices such as a mobile phone, a tablet computer, and a notebook computer. The base station may be, for example, an evolved NodeB (Evolved NodeB).

Spectra used by a wireless communications system are classified into two types: a licensed spectrum (licensed spectrum) and an unlicensed spectrum (unlicensed spectrum). For a commercial mobile communications system, an operator needs to purchase a licensed spectrum auctioned, and after being granted, can use a corresponding spectrum to carry out operational activities of mobile communication.

An unlicensed spectrum does not need to be sold by auction, and any person can legally use these frequency hands, for example, Wi-Fi devices in frequency bands of 2.4 GHz and 5 GHz use the unlicensed spectrum.

How the base station and the UE work in a licensed-spectrum-assisted unlicensed spectrum is one of issues that need to be researched in 5G (5th-Generation, $5^{th}$ generation mobile communications technology). Because there are other RAT (radio access technology, radio access technology) devices (for example, Wi-Fi AP) in the unlicensed frequency band, how to reduce or eliminate negative impact on existing communications devices has become a main direction of research on a technology related to an unlicensed carrier.

The wireless communications system uses the unlicensed spectrum with the following characteristics:

In eLAA (Enhancement licensed-assisted access, unlicensed-frequency-band assisted access), to ensure friendly coexistence of an LTE (Long Term Evolution, Long Term Evolution) base station and a Wi-Fi AP (Access point, access point) at an unlicensed frequency hand, an eLAA system uses technologies such as LBT (Listen-before-talk, Listen before talk), CCA-ED (Channel clear assessment-energy detection, clear channel assessment-energy detection), and discontinuous transmission from 802.11 systems in uplink and downlink directions.

Listen before talk is performing data transmission when it is determined that a channel is idle. A base station in a working state schedules, with reference to a current channel status, maximum transmission duration within which transmission is performed on a channel occupied once in an uplink or downlink direction, and releases the channel in a timely manner, so as to ensure communication quality of the Wi-Fi AP.

An LBT mechanism is a medium access control method that is applied to a Wi-Fi system at an unlicensed frequency band and that is the same as CSMA (Carrier Sense Multiple Access, Carrier Sense Multiple Access). A station that is to transmit data first monitors whether there is data transmitted on a medium, and if the medium is idle, the station can transmit data; otherwise, the station performs transmission after a period of deferral time elapses. The LBT technology is applied to the eLAA system. To satisfy different deferral period requirements of different services in different scenarios, 3GPP (3rd Generation Partnership Project, $3^{rd}$ Generation Partnership Project) proposes four specific LBT mechanisms for an eLAA DL (downlink) process:

(1) category 1: no LBT;
(2) category 2: LBT without random deferral;
(3) category 3: LBT with random deferral and with a fixed contention window maintained; and
(4) category 4: LBT with random deferral and with a variable contention window maintained.

For different service load or different channel environments at an unlicensed frequency band, the base station uses different categories (category, C for short) to implement an LBT process. Whether UE uses C2 LBT (25 μs one-shot LBT) and C4 LBT in an uplink direction in the system to perform channel detection depends on whether current transmission is performed at an MCOT (Max channel occupancy time, maximum channel occupancy time) occupied by previous transmission. If current transmission is performed at an MCOT occupied by a serving base station in a downlink direction or intra-cell UE in an uplink direction, a 25 μs LBT mechanism is used; otherwise, LBT C4 is used.

CCA-ED is a specific channel detection method used in LBT. Specifically, a sending node detects energy of a current channel in entire communication bandwidth before sending data and compares the energy with a specified energy threshold. If an energy detection result of the current channel is lower than the energy threshold, the sending node determines that the channel is idle, and performs self-decreasing of a deferral counter or sends data; or if an energy detection result of the current channel is higher than the energy threshold, the sending node determines that the channel is busy, and suspends a deferral counter or abandon data sending. In some embodiments of the present invention, CCA-ED may also be referred to as CCA.

The following two problems usually exist when the wireless communications system uses the unlicensed spectrum:

Problem 1: For Wi-Fi uplink/downlink communication and eLAA downlink communication, full-bandwidth scheduling is used; therefore, using a full-bandwidth CCA mechanism does not affect entire system performance. However, for uplink communication of the UE, an interlace (interlace) structure may be used for uplink resource allocation of the UE. When scheduling an uplink resource for the UE, the base station may choose to allocate one or more interlaces. In this case, the full-bandwidth LBT and CCA mechanisms are adverse to frequency division multiplexing for UE in an uplink direction. This may reduce utilization efficiency of an uplink spectrum and increase an uplink communication delay.

Problem 2: An eLAA communications system uses a subframe structure 3 specified by a current standard, each radio frame includes 10 system subframes, and there is no fixed uplink and downlink timeslot allocation. In eLAA downlink communication, the base station may continuously schedule and transmit one or more downlink subframes, and downlink transmission may start at any position of the subframe, but ends at a boundary of a subframe or occupies specified DwPTS duration of the last transmission subframe. One or more continuous subframes may also be scheduled for UE in an uplink direction, but a start position can be only at symbol 0 or symbol 1 of the $1^{st}$ subframe, and an end position is at symbol 12 or symbol 13 of the last subframe, so that an LBT position and a nonperiodic SRS (Sounding reference signal, sounding reference signal) transmission position are reserved. Because there is no fixed uplink and downlink allocation for the subframe structure 3, an uplink or downlink status at a current time point depends on uplink or downlink service load of a current cell. This may lead to asynchronization between adjacent cells in uplink and downlink directions. In addition, because the adjacent cells are in a same communication frequency band, asynchronization in uplink and downlink directions causes serious interference to communication of edge UEs. Consequently, a problem that hidden nodes in adjacent cells interfere with each other is caused.

To resolve the foregoing two problems, the embodiments of this application provide a data sending method and user equipment. Details are described in the following.

The embodiments of this application provide a data sending method and user equipment, to increase uplink time-frequency resource utilization.

Figure 3:
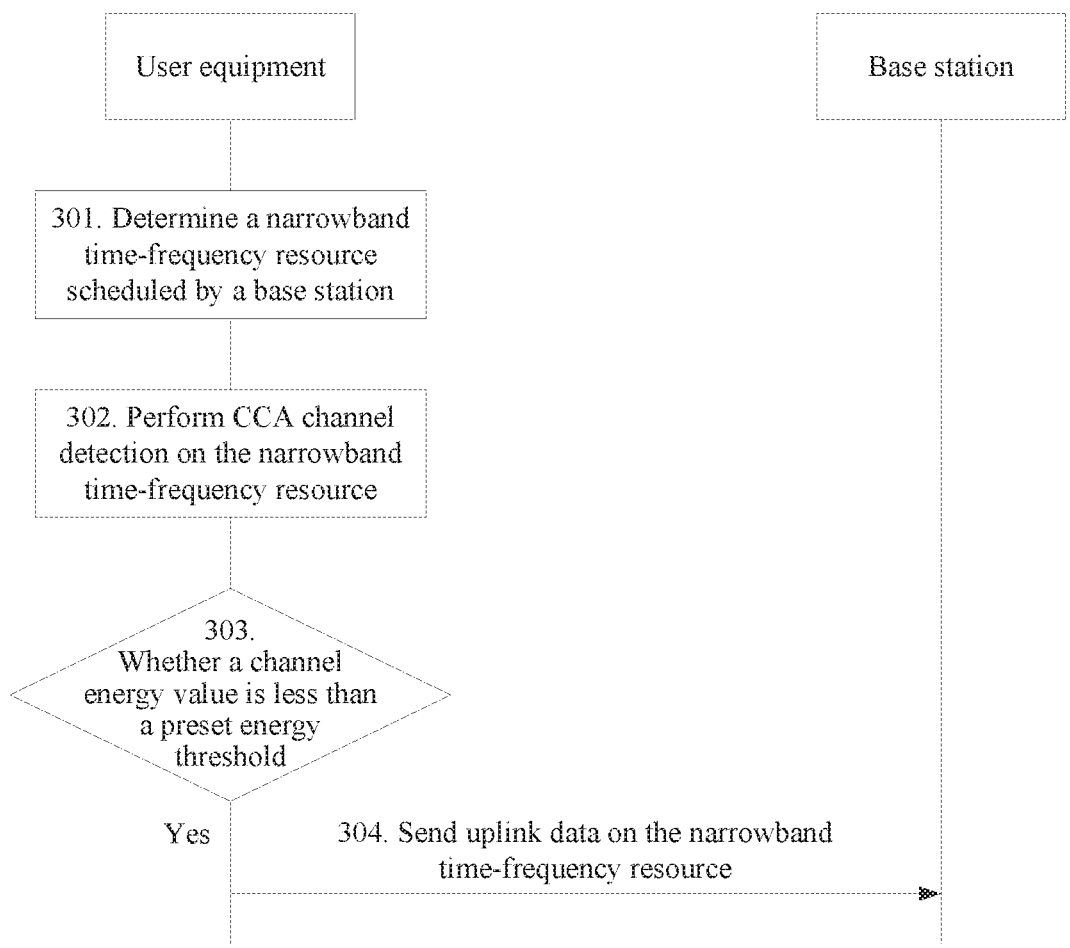
FIG. 3 is a flowchart of a data sending method according to another embodiment of this application.

FIG. 3 is a flowchart of a data sending method according to an embodiment of this application. The data sending method may be applied to the user equipment in the network architecture shown in FIG. 2. The data sending method provided in this embodiment of this application may be applied to user equipment that works in a 5G unlicensed frequency band communications system.

The data sending method in this embodiment of s application includes the following steps.

Step 301. User equipment determines a narrowband time-frequency resource scheduled by a base station.

The user equipment sends data on the narrowband time-frequency resource. The narrowband time-frequency resource is scheduled by the base station.

The narrowband time-frequency resource is a non full-bandwidth time-frequency resource. The base station may schedule different time-frequency resources for different UEs on the different time-frequency resources of a same subframe, so that the different UEs can send data simultaneously in a same data frame. The narrowband time-frequency resource may be the foregoing interlace. For specific description of the interlace, refer to the foregoing content. The narrowband time-frequency resource may alternatively be some continuous or discontinuous bandwidth of entire bandwidth.

There are a plurality of manners for the user equipment to determine the narrowband time-frequency resource scheduled by the base station. For example, the base station sends control information to the user equipment, where the control information is used to indicate the narrowband time-frequency resource scheduled for the user equipment, so that the UE can learn of the narrowband time-frequency resource scheduled for the UE by the base station. The control information may be, for example, UL grant delivered to the UE by using downlink control information.

Step 302. The user equipment performs CCA channel detection on the narrowband time-frequency resource to obtain a channel energy value of the narrowband time-frequency resource.

After determining the narrowband time-frequency resource scheduled for the UE by the base station and before sending the data by using the narrowband time-frequency resource, the UE needs to check whether the narrowband time-frequency resource is idle, that is, the user equipment performs CCA channel detection on the narrowband time-frequency resource. The channel energy value of the narrowband time-frequency resource can be obtained through CCA channel detection.

In this embodiment of this application, CCA channel detection performed by the user equipment on the narrowband time-frequency resource is narrowband CCA channel detection. That is, the user equipment performs CCA channel detection only on some narrowband time-frequency resources. The narrowband time-frequency resource is the narrowband time-frequency resource scheduled for the user equipment by the base station. In this way, the user equipment does not need to perform CCA channel detection on all time-frequency resources in the full bandwidth, thereby improving detection precision.

Step 303. The user equipment determines whether the channel energy value is less than a preset energy threshold; and if the channel energy value is less than the preset energy threshold, performs step 304.

The channel energy value obtained by performing CCA channel detection on the narrowband time-frequency resource by the user equipment reflects a use status of the narrowband time-frequency resource. If the channel energy value is less than the preset enemy threshold, it indicates that the channel energy value is idle, and in this case, the user equipment can perform self-decreasing of a deferral counter or send data on the narrowband time-frequency resource. If the channel energy value is greater than the preset energy threshold, it indicates that the narrowband time-frequency resource is occupied by another device, and in this case, the user equipment abandons sending of uplink data or suspends a deferral counter, and sends the data after a period of deferral time elapses. Uplink data is sent on the narrowband time-frequency resource when a channel energy value obtained by performing next CCA channel detection on the narrowband time-frequency resource is less than the preset energy threshold.

The preset energy threshold may be set depending on actual application or may be obtained by the user equipment from another device. The preset energy threshold is usually not equal to a channel energy value of full bandwidth.

Step 304. The user equipment sends uplink data to the base station on the narrowband time-frequency resource.

That the channel energy value is less than a preset energy threshold indicates that the current narrowband time-frequency resource is idle. In this case, the user equipment can send the uplink data to the base station on the narrowband time-frequency resource.

In conclusion, in the technical solution provided in this embodiment of this application, after determining the narrowband time-frequency resource scheduled by the base station, the user equipment performs CCA channel detection on the narrowband time-frequency resource to obtain the channel energy value of the narrowband time-frequency resource. Then the user equipment determines whether the channel energy value is less than the preset energy threshold; and if the channel energy value is less than the preset energy threshold, the user equipment sends the uplink data to the base station on the narrowband nine-frequency resource. In this case, the base station schedules the narrowband time-frequency resource for the user equipment, so that the user equipment sends the uplink data on the narrowband time-frequency resource. Different user equipments may perform data transmission on different narrowband time-frequency resources. In this case, the user equipment performs CCA channel detection on the narrowband time-frequency resource scheduled for the user equipment, and when the detected channel energy value is less than the preset energy threshold, it indicates that the narrowband time-frequency resource is idle, and the uplink data can be sent. When a narrowband time-frequency resource scheduled for one user equipment is idle and there is data transmitted on another narrowband time-frequency resource of the same subframe, a channel access failure may be caused if the user equipment uses full-bandwidth CCA channel detection. In this way, an opportunity of accessing a channel by the user equipment can be increased in a manner of performing CCA channel detection on the narrowband time-frequency resource, thereby increasing uplink time-frequency resource utilization.

To describe this embodiment of this application more intuitively, the following describes the data sending method in this embodiment of this application by using two specific scenarios. One scenario is to resolve a problem about uplink multiplexing for UE through narrowband LBT. The other scenario is to propose a narrowband-LBT-based CCA window (CCA detection window) mode, so as to improve communication quality of UE, and in particular, communication quality of cell-edge UE in a 5G unlicensed communications system.

Scenario 1

Figure 4:
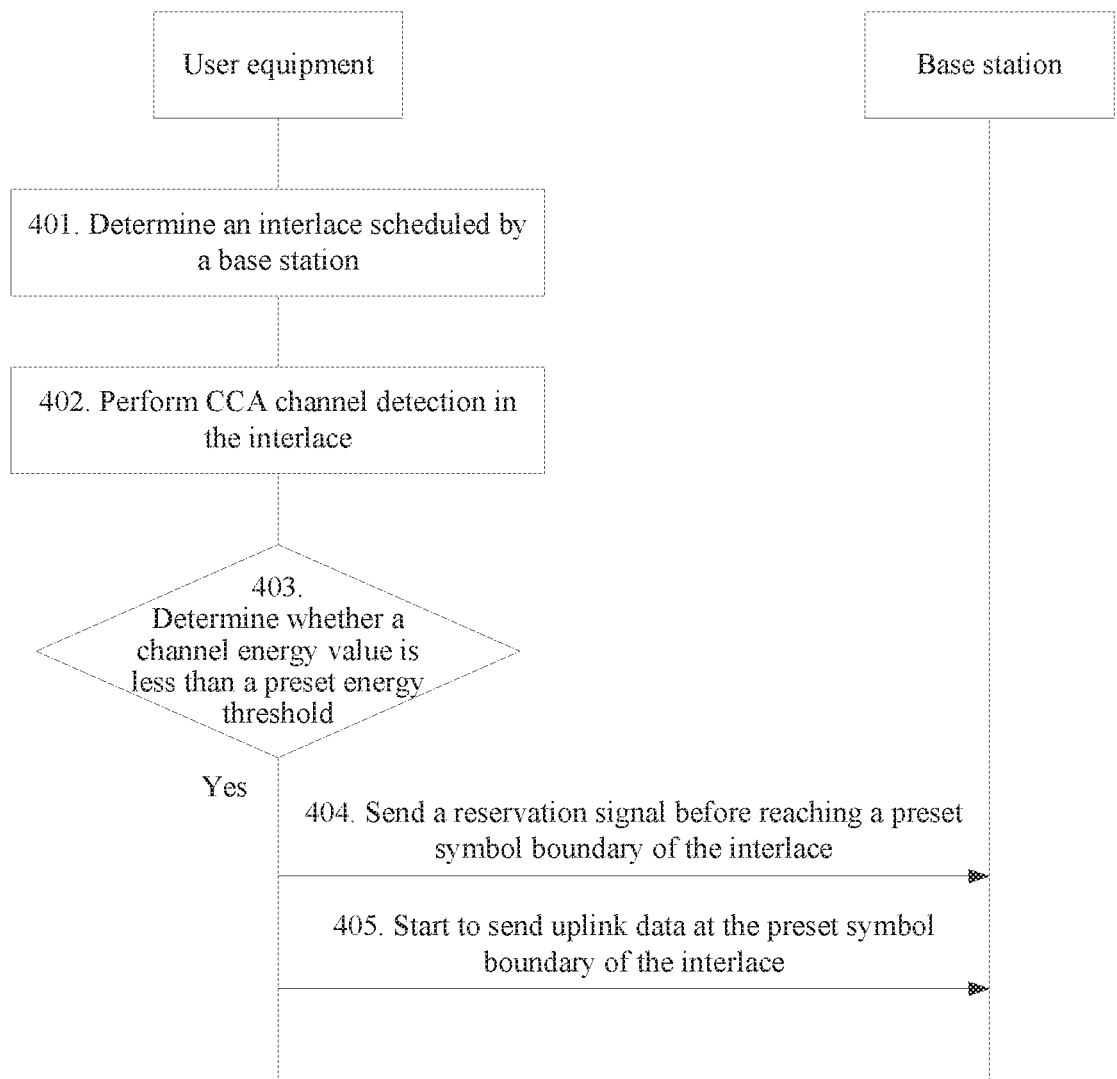
FIG. 4 is a flowchart of a data sending method according to another embodiment of this application.

FIG. 4 is a method flowchart of a data sending method according to an embodiment of this application. The data sending method may be applied to the user equipment in the embodiment shown in FIG. 2, and in particular, to all UEs in a 5G unlicensed communications system. Descriptions are provided in this embodiment of this application by using a specific scenario in which UE is applied to a 5G unlicensed communications system and a narrowband time-frequency resource is an interlace. It can be understood that the narrowband time-frequency resource in this embodiment of this application may be another specific implementation in addition to the interlace.

The data sending method provided in the embodiment shown in FIG. 4 is particularly suitable for resolving the problem 1.

During resolving of the problem 1, if a self-deferral (self-deferral) method and a reservation-signal (reservation signal) sending method are used, a decrease in uplink communication quality may be caused. Causes are as follows:

The 5G unlicensed communications system allows a base station to schedule a plurality of UEs for uplink transmission, but the plurality of UEs may have different deferral windows. Therefore, to ensure that the scheduled UEs do not interfere with each other's LBT process, data needs to be sent at a same symbol boundary, and self-deferral is performed before sending. In this case, a gap (gap) exists inevitably between ending deferral and starting to send the data by the UE, and consequently a channel may be preempted by another sending node, causing a channel loss of UE in an uplink direction and reducing uplink throughput and spectral efficiency of an unlicensed carrier.

If the method of sending a reservation signal is used to replace self-deferral, a serious problem also exists. UE also uses full-bandwidth LBT in an LBT process. Therefore, once it is found that there is a reservation signal in a channel, it is considered that the channel is busy and a deferral counter is frozen. In this case, uplink communication quality of an unlicensed carrier is seriously reduced.

Figure 5:
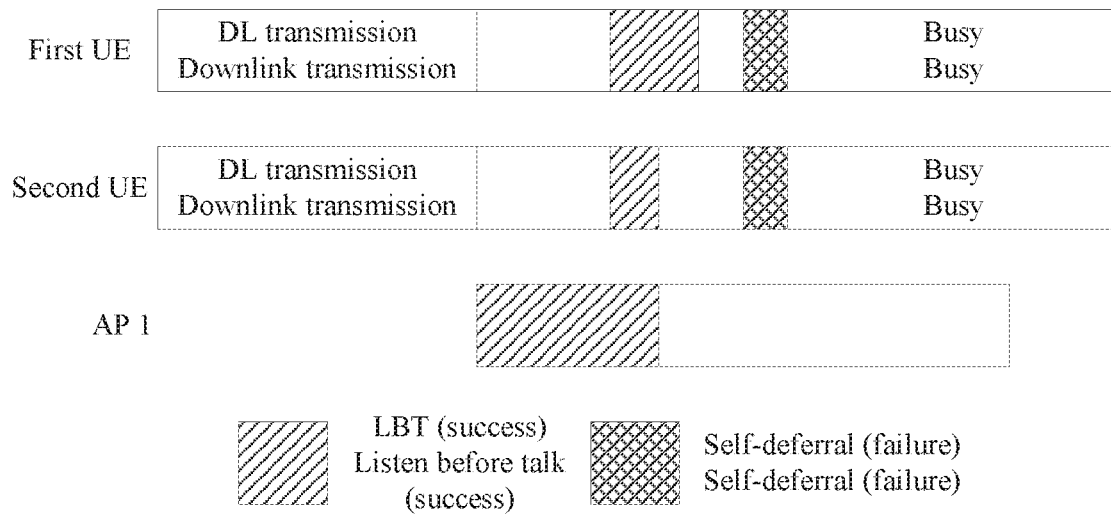
FIG. 5 is a schematic diagram of uplink sending of UE according to another embodiment of this application.
Figure 6:
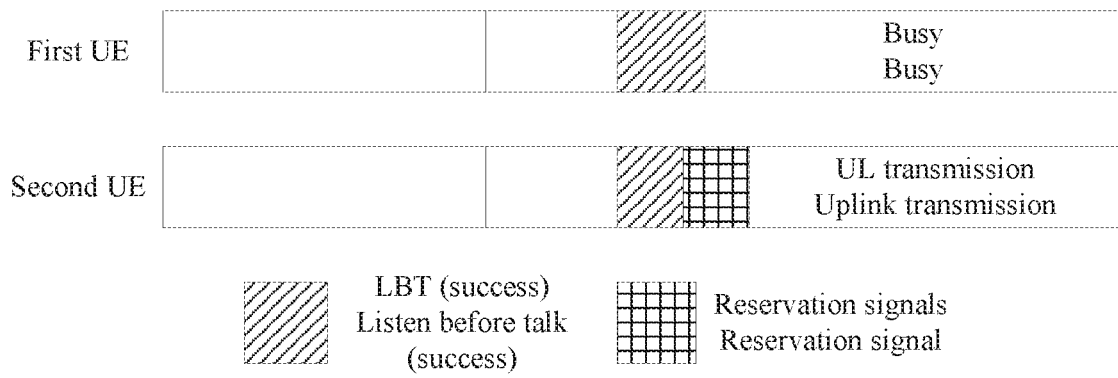
FIG. 6 is a schematic diagram of uplink sending of UE according to another embodiment of this application.

As shown in FIG. 5 and FIG. 6, first UE and second UE are two users served by a same cell, and are scheduled by the base station to send uplink data in a same subframe. LBT deferral duration of the first UE is relatively long. If the self-deferral manner is used as shown in FIG. 5, there is possibility that a channel is preempted by a Wi-Fi AP in the gap existing before sending. If sending a reservation signal after LBT succeeds as shown in FIG. 6, the second UE blocks LBT of the first UE. Regardless of which method is used, uplink multiplexing efficiency of the UE is reduced.

Therefore, an embodiment of this application provides a data sending method, to ensure efficient frequency division multiplexing for a plurality of UEs in an uplink direction by using an improved LBT CCA mechanism and occupying frequency-domain bandwidth by using a reservation signal.

Referring to FIG. 4 and the embodiment shown in FIG. 2 and FIG. 3, the data sending method in this embodiment of this application includes the following steps.

Step 401. User equipment determines an interlace scheduled by a base station.

For step 401, refer to specific descriptions of step 301.

For example, the base station sends control information UL grant (uplink scheduling grant) to the UE. The UL grant is used to indicate, to the UE, an interlace scheduled for the UE by the base station. In this case, based on the control information, the UE can learn of information about the interlace scheduled by the base station.

Step 402. The user equipment performs CCA channel detection in the interlace, to obtain a channel energy value of the interlace.

After determining the interlace scheduled by the base station and before sending uplink data, the user equipment performs CCA channel detection in the interlace to detect the channel energy value of the interlace.

Because the resource scheduled for the UE is only an interlace resource in full bandwidth, uplink communication quality can be ensured provided that a channel is idle in a scheduled frequency band. Therefore, during uplink transmission, the UE can use a narrowband LBT mechanism performed based on a frequency domain. That is, CCA channel detection is performed only in the scheduled interlace, and data can be sent after it is detected that the channel is idle, if the channel is busy, narrowband CCA detection is performed after a period of deferral time elapses.

Figure 7:
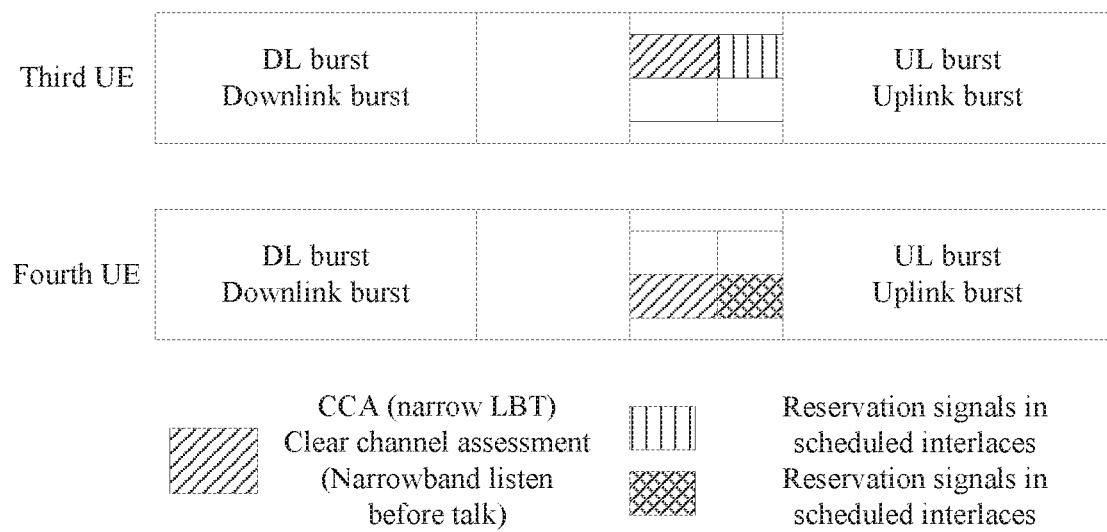
FIG. 7 is a schematic diagram of narrowband LBT according to another embodiment of this application.

For example, FIG. 7 is a schematic diagram of narrowband LBT of third UE and fourth UE. A same subframe is scheduled for the third UE and the fourth UE in a same serving cell to transmit data. A frequency-domain resource interlace #1 is scheduled for the third UE, and a frequency-domain resource interlace #2 is scheduled for the fourth UE. In a subframe start position, the third UE detects a channel status only in the frequency band interlace #1 to obtain a channel energy value, and the fourth UE performs CCA channel detection only in the frequency band interlace #2 to obtain another channel energy value.

Step 403. The user equipment determines whether the channel energy value is less than a preset energy threshold, and if the channel energy value is less than the preset energy threshold, performs step 404.

After detecting the channel energy value, the user equipment determines whether the channel energy value is less than the preset energy threshold. The preset energy threshold is a threshold used to determine whether the narrowband time-frequency resource is idle. The preset energy threshold may not be equal to a channel energy value of entire bandwidth.

If the channel energy value detected by the user equipment is less than the preset energy threshold, it indicates that the currently scheduled interlace is idle. The user equipment can send uplink data in the interlace. If the channel energy value detected by the user equipment is greater than the preset energy threshold, it indicates that the currently scheduled interlace is in a busy state, and the currently scheduled interlace is occupied by another device. For example, a Wi-Fi node occupies the interlace currently to send data; in this case, the user equipment can suspend a deferral counter or abandon sending of uplink data.

Step 404. The user equipment sends a reservation signal before reaching a preset symbol boundary of the interlace, to occupy the interlace.

When the channel energy value detected by the user equipment is less than the preset energy threshold, it indicates that the currently scheduled interlace is idle, and the user equipment can use the interlace to send data. Sending of the uplink data starts at the preset symbol boundary of the subframe, for example, a start boundary of the $1^{st}$ symbol of the subframe, and the 5G unlicensed system also includes another device, for example, a Wi-Fi node or edge user equipment in a neighboring cell; therefore, the interlace may be occupied by another node before the user equipment to which the interlace belongs sends the uplink data. In this case, the user equipment may fail in channel access even if detecting that the interlace scheduled for the user equipment is available. In view of this, before sending the uplink data, the user equipment sends the reservation signal before reaching at the preset symbol boundary of the interlace. In this way, the interlace can be occupied to prevent another device from preempting the interlace.

For example, once the third UE and the fourth UE in FIG. 7 detect that channels scheduled by the UEs respectively are idle, reservation signals are sent on the scheduled resources until a start position of symbol 1 is reached.

Step 405. The user equipment starts to send uplink data to the base station at the preset symbol boundary of the interlace.

The user equipment performs narrowband CCA to detect that the scheduled interlace is available, and the reservation signal is used to occupy the channel, so that the uplink data can be sent in a predetermined position. That is, the user equipment starts to send the uplink data to the base station at the preset symbol boundary of the interlace.

For example, the third UE and the fourth UE in FIG. 7 send reservation signals on the scheduled resources respectively until the start position of symbol 1 is reached, and the third UE and the fourth UE starts to send the uplink data in the start position of symbol 1.

In this way, the UE performs CCA detection and sends the reservation signal only in the currently scheduled interlace, and uses narrowband LBT and a narrowband reservation signal in an uplink direction to occupy a channel. This can effectively implement frequency division multiplexing for UEs in different LBT modes, and ensure uplink communication quality and spectrum utilization efficiency of UE in a 5G unlicensed communications system. In addition, a sending frequency band can be occupied by sending the narrowband reservation signal to prevent a channel from being preempted by a sending node. In this way, the method in this embodiment of this application improves uplink quality and uplink spectrum utilization efficiency of the 5G unlicensed communications system.

An existing uplink LBT mechanism for UE uses time-domain full-bandwidth LBT, that is, CCA channel detection is performed within entire bandwidth of a communications system. However, this LBT mechanism may cause mutual uplink blocking of UEs that configure different LBT modes or a channel is occupied by a Wi-Fi sending node. In the data sending method in this embodiment of this application, an LBT mode is executed from a time domain to a frequency domain, and narrowband CCA detection and sending of reservation signals are performed only in a scheduled frequency band. Regardless of which LBT mode used by the UE, uplink frequency division multiplexing in a system can be effectively implemented by defining LBT as frequency-domain narrowband LBT. This can improve uplink quality and uplink spectrum utilization efficiency of a 5G unlicensed communications system.

It can be understood that in some embodiments of this application, if the channel energy value detected by the user equipment is less than the preset energy threshold, the user equipment sends the uplink data to the base station in the scheduled interlace. The user equipment may not send the reservation signal in advance. In this case, there is a risk that the interlace is preempted by another device; however, a case of mistakenly determining, when there is data sent in another interlace, that the interlace scheduled for this user equipment is busy is avoided because the user equipment uses narrowband CCA detection, to be specific, CCA detection is performed only in the scheduled interlace. In this way, a probability that the user equipment detects that a channel is idle is still greater than that in full-bandwidth CCA detection. That is, relative to the full-bandwidth LBT manner, the method in this embodiment of this application can improve uplink quality and resource utilization.

The foregoing describes one of specific scenarios in which the data sending method in this embodiment of this application is applied to the 5G unlicensed communications system. Further, the method in this embodiment of this application further provides a data sending method. The data sending method can be applied to edge UE in the 5G unlicensed communications system. For details, see descriptions in the following.

Scenario 2

Figure 8:
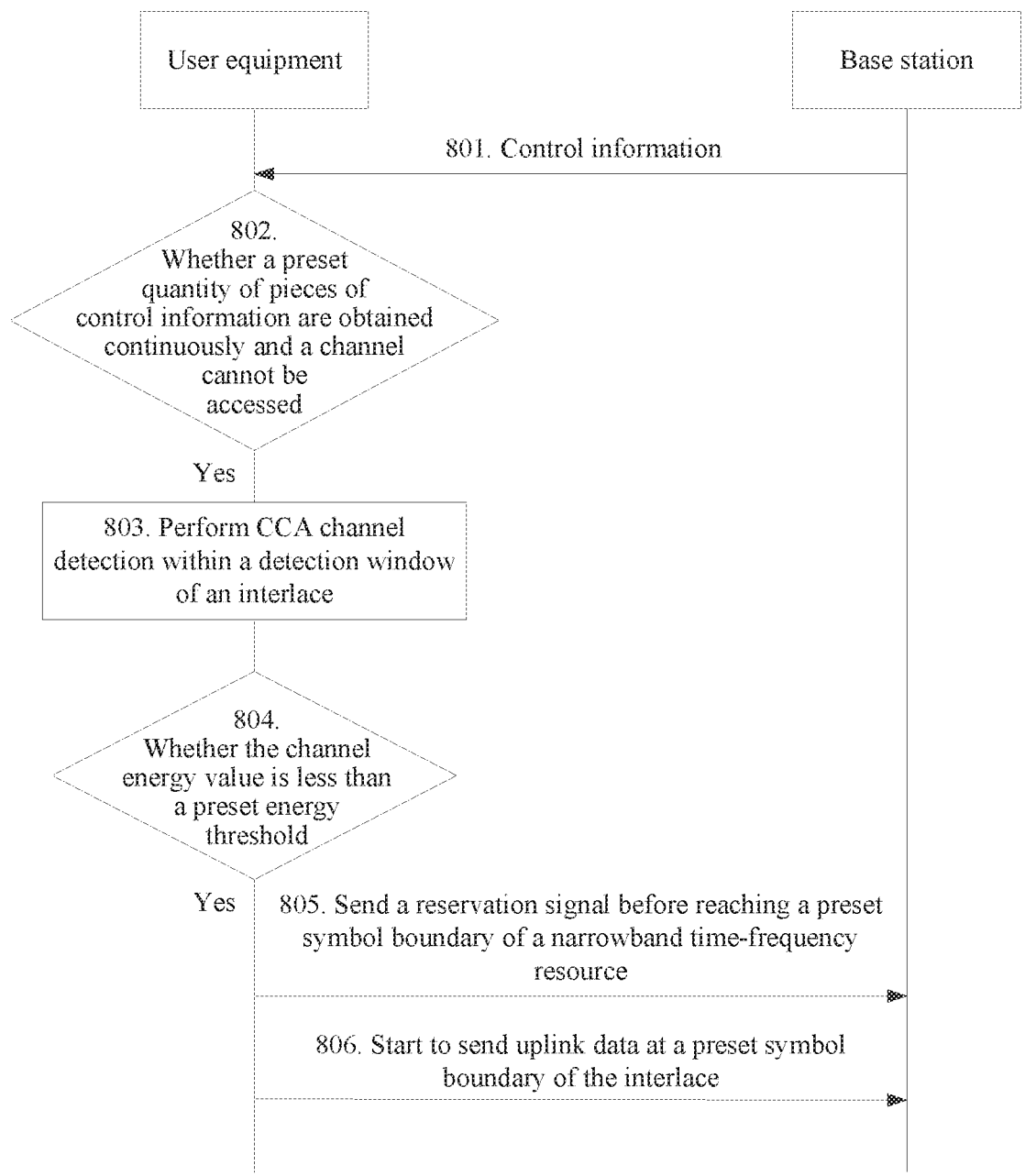
FIG. 8 is a flowchart of a data sending method according to another embodiment of this application.

FIG. 8 is a flowchart of a data sending method according to an embodiment of this application. The data sending method may be applied to the user equipment in the embodiment shown in FIG. 2, and in particular, to UE in the 5G unlicensed communications system. Descriptions are provided in this embodiment of this application by using a specific scenario in which UE is applied to a 5G unlicensed communications system and a narrowband time-frequency resource is an interlace. It can be understood that the narrowband time-frequency resource in this embodiment of this application may be another specific implementation in addition to the interlace.

The data sending method provided in the embodiment shown in FIG. 8 is particularly suitable for resolving the problem 2.

To better understand beneficial effects of the data sending method in this embodiment of this application, the problem 2 is further described now. That is, brief description is provided for a phenomenon that a hidden node in adjacent cells interferes with edge UE in uplink and downlink directions in an existing 5G unlicensed communication scenario. Details are as follows.

Figure 9:
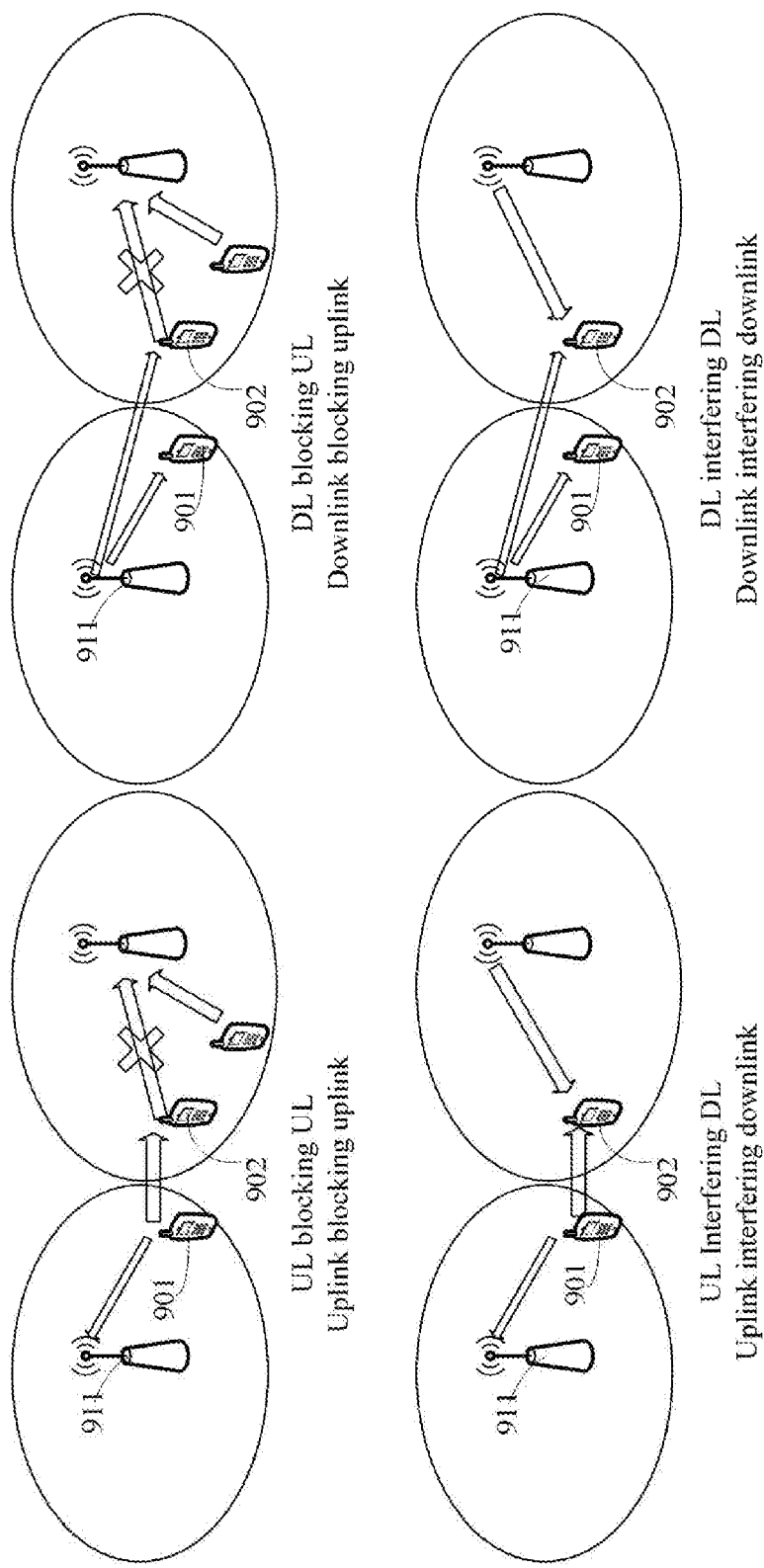
FIG. 9 is a schematic diagram of interference of a hidden node in an adjacent cell according to another embodiment of this application.

A serving radius of a cell is relatively small in the 5G unlicensed communication scenario and base stations are deployed relatively densely; therefore, in the 5G unlicensed communication scenario, there are usually UEs that perform uplink and downlink communication at an edge of the cell. The 5G unlicensed communications system uses a frame structure 3, and edge UEs in adjacent cells may fail to perform uplink and downlink synchronization; therefore, relatively high interference may exist between the edge UEs. As shown in FIG. 9, for a first cell (cell) and a second cell that are adjacent cells, UE 901 and UE 902 are edge user equipment in the two cells, and serious impact is caused on the UE 902 when the UE 901 performs uplink and downlink communication. Specific interference is classified into the following four scenarios:

(1) Uplink transmission of the UE 901 causes a failure in uplink channel detection of the UE 902.

(2) An excessively high downlink sending power from the base station 911 to the UE 901 causes a failure in uplink channel detection of the UE 902.

(3) Uplink transmission of the UE 901 causes relatively strong interference to downlink transmission of the UE 902.

(4) An excessively high downlink power from the base station 911 to the UE 901 causes interference to downlink reception of the UE 902.

In the current LBT mode, a problem of mutual interference of hidden nodes in adjacent cells cannot be resolved. Edge UE may be interfered with by a hidden node for a long period of time and cannot perform uplink transmission, and the edge UE cannot notify the base station of existence of the hidden node; consequently, the base station cannot take a specified measure regarding the scenario.

Therefore, this embodiment of this application proposes a new LBT mode, to increase an opportunity of accessing an uplink channel by edge UE interfered with by a hidden node in an adjacent cell, improve uplink communication quality. In addition, interaction between affected UE and a base station enhanced, to provide a high-quality downlink service. For details, see descriptions in the following.

Referring to FIG. 8 and the embodiment shown in FIG. 2 and FIG. 3, the data sending method provided in an embodiment of this application includes the following steps.

Step 801. User equipment obtains control information sent by a base station.

The control information is used to indicate, to the user equipment, an interlace scheduled by the base station. To indicate the interlace scheduled for the user equipment, the base station sends the control information including the indication to the user equipment, where the control information may be, for example, UL grant. When obtaining the control information, the user equipment can determine the interlace that can be used by the user equipment.

Figures 10, 11:
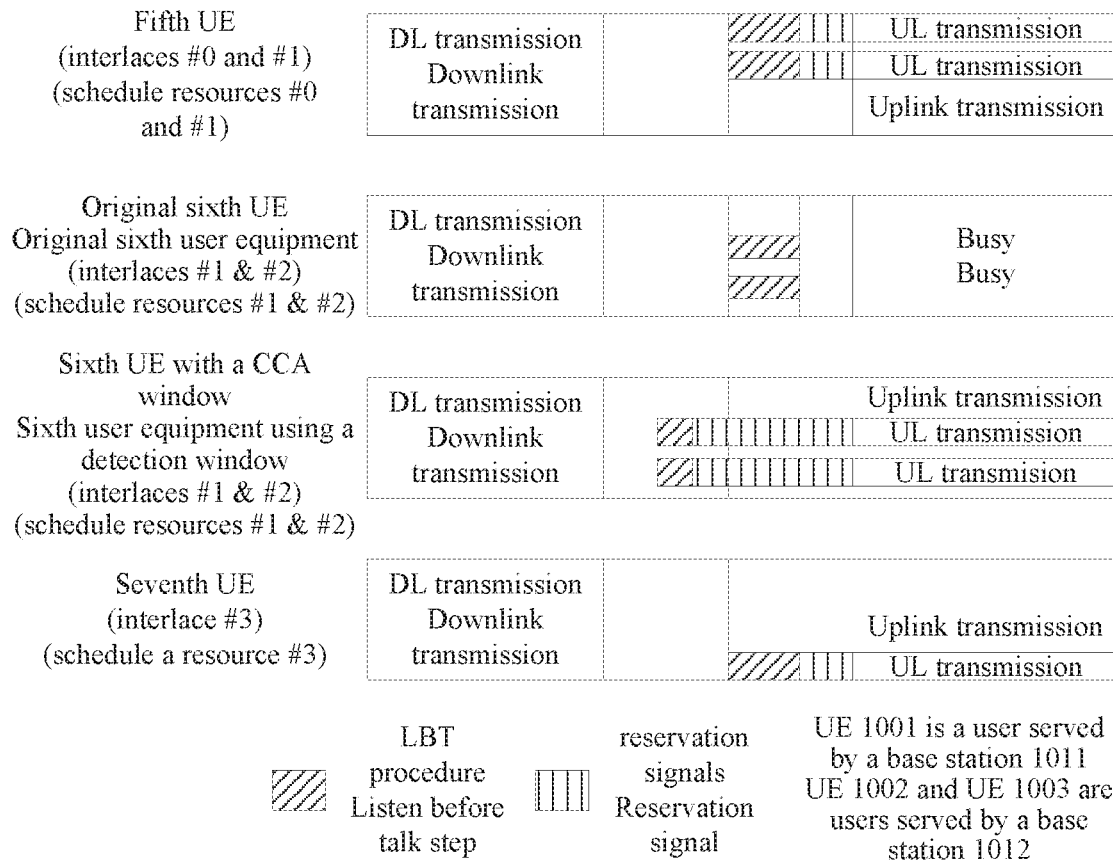
FIG. 10 is a schematic diagram of transmission of edge UE in a CCA window mode according to an embodiment of this application.
FIG. 11 is a schematic diagram of a detection window according to another embodiment of this application.

For example, FIG. 10 is a schematic diagram of transmission of edge UE in a CCA window mode according to an embodiment of this application. As shown in FIG. 10, fifth UE is edge user equipment served by a first base station, sixth UE is edge user equipment served by a second base station, and seventh UE is a non-edge user equipment served by the second base station. The base station sends UL grant to the UE served by the base station, to notify the UE of the scheduled interlace. For example, the first base station schedules resources interlace #0 and interlace #1 for the fifth UE, and the second base station schedules resources interlace #1 and interlace #2 for the sixth UE, and schedules a resource interlace #3 for the seventh UE.

Step 801 is one of specific implementations of determining, by user equipment, a narrowband time-frequency resource scheduled by a base station.

Step 802. The user equipment determines whether a preset quantity of pieces of control information are obtained continuously and a channel cannot be accessed; and if the preset quantity of pieces of control information are obtained continuously and a channel cannot be accessed, the user equipment performs step 803.

The preset quantity may be determined based on an indication delivered by the base station or may be predetermined by the user equipment.

Before the user equipment performs CCA channel detection within a detection window of a narrowband time-frequency resource, when edge UE in a current cell continuously obtains the preset quantity of pieces of control information but cannot access a channel, the UE may determine that the UE is interfered with by edge user equipment in a neighboring cell, resulting a failure in channel access. Therefore, the edge user equipment in this cell can trigger the detection window mode for CCA channel detection. The detection window may be referred to as a CCA window in this embodiment of this application. The data sending method used in this embodiment of this application may be referred to as a detection window mode or a CCA window mode.

If the UE in the current cell does not obtain the preset quantity of pieces of control information continuously, or if the UE can access a channel before obtaining the preset quantity of pieces of control information continuously, the UE is not interfered with by edge UE in a neighboring cell, or interference is acceptable; the UE in the current cell may access a channel by following a normal process or may access a channel in a manner in scenario 1, to send the uplink data.

For example, as shown in FIG. 10, adjacent cells may not be synchronized in uplink and downlink directions. Therefore, if an original LBT mode of a system is used, that is, a full-bandwidth LBT mode is used, edge user equipment, sixth UE, always fails to access a channel due to interference of edge user equipment, fifth UE, in a neighboring cell on a multiplexing resource interlace #1 in an uplink direction.

In some embodiments of this application, before step 802 is performed, a pre-configuration operation may be performed on the user equipment, for example, the base station determines whether the user equipment can use the method in this embodiment of this application, to treat each user equipment more fairly. Specifically, when the edge UE in the cell continuously receives a preset quantity of UL grants but cannot access a channel due to interference of a hidden node in an adjacent cell, the UE triggers a CCA mode based on a pre-configuration of the base station. That is, whether the UE supports the CCA window mode can be configured by the base station when the UE accesses a cell.

For example, the base station performs semi-static configuration by using higher layer signaling such as RRC signaling, to configure whether the UE supports a CCA window mode. For example, when the base station configures 1-bit information, 1 indicates that the UE supports the mode, and 0 indicates that the UE does not support the mode. When signaling received by the UE from the base station is 1, if the UE receives UL grant for preset N continuous times but cannot access a channel, the UE starts a CCA window mode. However, if signaling received by the UE is 0, it indicates that the UE does not support the CCA window mode. In this case, even if the UE continuously receives a preset quantity of UL grants but cannot access a channel, the UE cannot start the CCA window mode.

It can be understood that the "preset quantity" in step 802 may be pre-configured by the base station. For example, the base station may perform configuration based on priorities of different UEs and deliver an indication. Different priorities of the UEs are defined by the base station. For example, the base station configures the preset quantity based on a service type of the uplink data sent by the UE. For example, for an urgent service, a priority is relatively high, and a value of the preset quantity of obtained control information is relatively small. No specific limitation is imposed on specific settings of the preset quantity in step 802 in this embodiment of this application.

Step 803. The user equipment performs CCA channel detection within a detection window of the interlace, to obtain a channel energy value of the interlace.

The narrowband time-frequency resource includes a subframe. The detection window is a preset position in the subframe. That is, the user equipment performs CCA channel detection in a preset position of a subframe in the interlace. For detection of a specific preset position, a detection result is affected by the preset position. For example, if detection is performed in a preset position in which a possibility of being idle is high, a probability of succeeding in CCA detection by the user equipment is relatively high, and a possibility of accessing a channel by the user equipment is also high.

In some embodiments of this application, the interlace includes a subframe, and the detection window is a position of the last symbol in the $N^{th}$ subframe of the interlace and/or a position of the $1^{st}$ symbol in the $(N+1)^{th}$ subframe, where N is a positive integer. A subframe includes 14 symbols. One or more continuous subframes may be scheduled for UE in an uplink direction, but a start position is symbol 0 or symbol 1 in the $1^{st}$ subframe, and an end position is symbol 12 or symbol 13 in the last subframe. In this case, a probability that a channel is idle is relatively high at symbol 0 or symbol 13. Therefore, a detection window, a CCA window, is set at symbol 0 or symbol 13. In this way, a success rate of performing CCA detection by the UE can be increased. If CCA detection is performed in a position different from symbol 0 or symbol 13, a probability that these symbols are occupied by UE in a neighboring cell is relatively high, and a probability that edge UE in this cell fails to access a channel is also high.

It can be understood that in the embodiment in which a subframe includes 14 symbols, the $1^{st}$ symbol of the subframe may be marked as symbol 0, and the last symbol of the subframe may be marked as symbol 13.

In some embodiments of this application, to reduce energy consumption for performing CCA detection by the user equipment, the user equipment may perform CCA detection in some preset specific positions within a detection window. For example, the detection window is a position of a preset symbol in the subframe, and the preset symbol includes a plurality of detection position points. One of specific implementations of step 803 is: performing, by the user equipment, CCA channel detection at the plurality of detection position points. In this way, CCA detection does not need to continue to be performed, and an idle state of a channel can be found in a timely way, achieving a power saving effect.

To describe the foregoing content more intuitively, FIG. 11 is a schematic diagram of a detection window. The $1^{st}$ symbol or the last symbol of a sending subframe in an uplink direction in a 5G unlicensed communications system may be idle. Therefore, multiple one-shot CCA positions are set in this application by using the last symbol in a subframe N and the $1^{st}$ symbol in a subframe N+1. The multiple one-shot CCA positions are a plurality of detection position points. The plurality of detection position points may form a detection window. As shown in FIG. 11, the detection window includes four detection position points. No specific limitation is imposed on a specific quantity of detection position points in this embodiment of this application. The edge UE detects whether the channel is idle in any detection position point of the CCA window, and if determining that an interlace in the detection position point is idle, may perform the following step: for example, immediately sending a reservation signal until uplink transmission starts at a symbol boundary, thereby ensuring uplink transmission channel multiplexing for UEs in a same cell.

Step 804. The user equipment determines whether the channel energy value is less than a preset energy threshold; and if the channel energy value is less than the preset energy threshold, performs step 805.

The user equipment obtains the channel energy value in the foregoing manner. The channel energy value reflects a status about whether the currently scheduled interlace is occupied. If the channel energy value is less than the preset energy threshold, it can be determined that the scheduled interlace is idle, and the user equipment can send uplink data in the interlace. If the channel energy value is greater than the preset energy threshold, it can be determined that the scheduled interlace is occupied by another node, and the user equipment can abandon sending of the uplink data or perform channel detection after a period of deferral time elapses.

Step 805. The user equipment sends a reservation signal before reaching a preset symbol boundary of the narrowband time-frequency resource, to occupy the narrowband time-frequency resource.

Because a channel occupation position is specified for the sent uplink data, when the detected channel energy value is less than the preset energy threshold, the user equipment can determine that the currently scheduled interlace is idle. In this case, before the user equipment does not reach the position for sending the uplink data, the interlace may also be preempted by another node even if CCA detection succeeds. To prevent the another node from preempting the interlace, before the user equipment sends the uplink data to the base station on the narrowband time-frequency resource, if determining that the currently scheduled interlace is idle, the user equipment can send a reservation signal before reaching the preset symbol boundary, to occupy the scheduled interlace in advance.

In the embodiment shown in FIG. 11, if narrowband CCA succeeds in any detection position point of the detection window, the user equipment can immediately send a narrowband reservation signal until reaching the preset symbol boundary.

For example, as shown in FIG. 10, the sixth UE detects, in the $1^{st}$ detection position point of the detection window in the interlace #1, that the channel is idle, and then sends a reservation signal. In this way, the interlace #1 is occupied by the sixth UE. However, the interlace #2 is not reused by the fifth UE in a neighboring cell, so that the sixth UE performs narrowband CCA detection in a manner of the detection window, and there is a relatively high possibility of accessing a channel successfully. A resource scheduled for the seventh UE differs from that for the sixth UE. Therefore, provided that the seventh UE uses narrowband LBT and a narrowband reservation signal, the detection window mode does not exert any impact on the seventh UE.

Step 806. The user equipment starts to send uplink data to the base station at the preset symbol boundary of the interlace.

The preset symbol boundary is a specified position for sending the uplink data, for example, a start boundary position of symbol 1 of the subframe.

After reaching the preset symbol, the user equipment stops sending the reservation signal, and sends uplink data to the base station.

In some embodiments of this application, after the user equipment starts the detection window mode and successfully accesses a channel, in other words, after the data sending method is used, the user equipment may return to a normal LBT mode before next data sending, so as to avoid interference to the UE in the neighboring cell, thereby maintaining fair use of each user equipment in the communications system.

In some embodiments of this application, to notify the base station that the user equipment is affected by edge user equipment in a neighboring cell, so as to ensure that the base station can improve downlink communication quality, the data sending method provided in this embodiment of this application further has another implementation. For example, if the channel energy value is less than the preset energy threshold, the data sending method in this embodiment of this application further includes: sending, by the user equipment, acknowledgment information to the base station on the narrowband time-frequency resource, so that triggered by the acknowledgment information, the base station adjusts downlink power allocation for the user equipment.

By using the acknowledgment information, the user equipment may notify the base station that the user equipment is interfered with by UE in a neighboring cell. The acknowledgment information may be 1-bit preset information.

For example, as shown in FIG. 10, the edge user equipment, that is, the sixth UE, starts the detection window mode, and after successfully accessing a channel, the sixth UE sends 1-bit acknowledgment information to the base station, so as to confirm, to the base station, that the detection window mode is started. After receiving the acknowledgment information, the base station learns, based on the acknowledgment information, that edge user equipment in the neighboring cell may exist and the edge user equipment in the neighboring cell interferes with the sixth UE. In this case, the base station adjusts downlink power allocation, for example, increasing a reference signal (reference signal) sending power, to improve downlink communication quality of the sixth UE. In some embodiments, to keep downlink communication of the sixth UE from severely interfering with the edge user equipment in the neighboring cell, after determining that a proportion of ACK (acknowledgment information) for HARQ (Hybrid Automatic Repeat reQuest, hybrid automatic repeat request) reaches a specified value, the base station returns to a power configuration state that is before reconfiguration is performed.

In some embodiments of this application, to reduce interference to UE in a neighboring cell, UE in a current cell may choose to send the reservation signal only on some resources when there are a plurality of interlaces scheduled for the UE in the current cell, for example, sending the reservation signal in an interlace that does not affect the UE in the neighboring cell. Specifically, before the user equipment sends the reservation signal in the interlace before reaching the preset symbol boundary, the data sending method in this embodiment of this application further includes: determining, by the user equipment from a plurality of interlaces, a target interlace in which access fails continuously within a preset time, where the target interlace is an interlace scheduled for the user equipment. Through CCA channel detection, the user equipment can determine a severely interfered frequency band, and the target interlace is the severely interfered frequency band. By recording the frequency hand that receives severe interference within a time in which channel access continuously fails, the user equipment deduces that the edge user equipment in the neighboring cell may occupy the target interlace. In this case, the user equipment sends the reservation signal before reaching a preset symbol boundary of an interlace of the plurality of interlaces except the target interlace. In this way, sending of the reservation signal by the user equipment does not affect data sending of the edge user equipment in the neighboring cell because the target interlace may be an interlace scheduled for the edge user equipment in the neighboring cell. However, when sending the uplink data, the user equipment still starts to send the uplink data to the base station at a preset symbol boundary of the plurality of interlaces. In this way, the user equipment does not use a severely interfered time-frequency resource as much as possible when sending the reservation signal, to avoid UE in a neighboring cell from being blocked. All scheduled interlaces are still used for transmission of the uplink data, to ensure communication quality of current user equipment and reduce receiver-side receiving complexity of a base station.

For example, as shown in FIG. 10, the sixth UE determines, based on a previous channel detection result, the interlace #1 as a resource used by the edge UE in the neighboring cell; and therefore sends the reservation signal only in the interlace #2. In this way, no channel is lost, and specified deferral is provided for channel detection performed by the fifth UE. However, when the sixth UE sends data, to ensure uplink quality of the sixth UE and avoid additional detection load onto the base station, transmission of the uplink data performed by the sixth UE still occupies bandwidth of all scheduled interlaces.

It can be understood that in some embodiments of this application, if the channel energy value detected by the user equipment is less than the preset energy threshold, the user equipment sends the uplink data to the base station in the scheduled interlace. The user equipment may not send the reservation signal in advance. In this case, there is a risk that the interlace is preempted by another device; however, a case of mistakenly determining, when there is data sent in another interlace, that the interlace scheduled for this user equipment is busy is avoided because the user equipment uses narrowband CCA detection, to be specific, CCA detection is performed only in the scheduled interlace. In this way, a probability that the user equipment detects that a channel is idle is still greater than that in full-bandwidth CCA detection, so that there is a higher possibility of successfully accessing a channel by the user equipment. In addition, in the method in this embodiment of this application, CCA detection is performed within the detection window of the scheduled interlace. CCA detection can be performed in a preset position of the interlace, to meet more requirements on detection. In particular, when the detection window is set in a position that has a high probability of being idle, a probability that the user equipment detects that the scheduled interlace is idle is also high, thereby increasing a success rate of channel access.

In this way, an opportunity of accessing an uplink channel by edge UE interfered with by a hidden node may be increased in a detection window mode, thereby improving uplink quality of the edge UE.

In addition, interaction between the edge UE and the base station is enhanced, and the base station is notified of existence of an edge hidden node that interferes with the edge UE, so that the base station reconfigures downlink power allocation when determining that the hidden node exists, ensuring downlink communication link quality. In addition, the base station avoids vicious competition between adjacent cells by using a timely deferral measure, ensuring fairness between edge UEs. In this way, an LBT mode of the detection window can resolve a problem of interference of a hidden node in adjacent cells to edge UE in an uplink direction and in a downlink direction, ensuring fairness of edge UEs in cells and improving uplink and downlink communication quality of the edge UEs.

Specifically, a current eLAA communications system uses four LBT modes. For C2 LBT, once channel detection fails, detection can be performed only in a next scheduled subframe. For C3 LBT and C4 LBT, transmission can be started only after a deferral counter is cleared. In a detection window mode, a detection window, that is, a CCA window is set by using the last symbol in a previous subframe that may be idle and the $1^{st}$ symbol of a current subframe, and a channel can be immediately preempted provided that CCA detection performed in any detection position point of the detection window succeeds. With a minimum change made to an existing framework, this increases an opportunity of accessing a channel by edge UE interfered with by a hidden node in adjacent cells. In addition, interaction between UE and a base station is enhanced, so that the base station can adjust downlink power allocation based on a status of currently served edge UE, thereby improving downlink quality.

Figure 12:
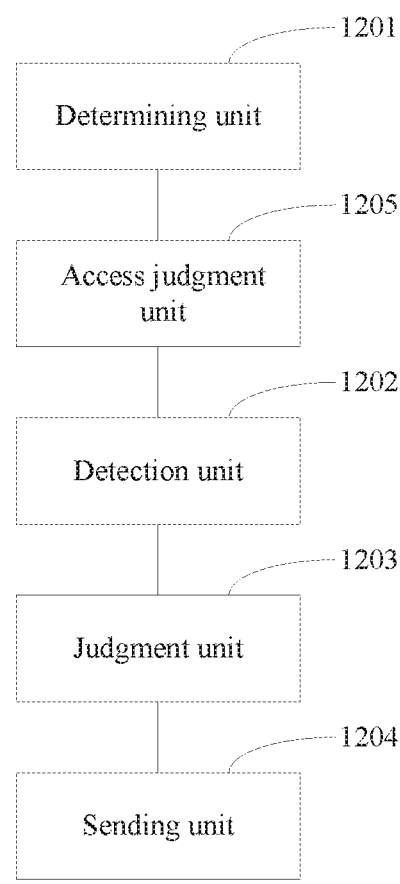
FIG. 12 is a schematic structural diagram of user equipment according to another embodiment of this application.

FIG. 12 is a schematic structural diagram of user equipment according to an embodiment of this application. The user equipment can be configured to perform the methods in the embodiments of the foregoing data sending methods. Referring to FIG. 12, the user equipment includes:

a determining unit 1201, configured to determine a narrowband time-frequency resource scheduled by a base station;

a detection unit 1202, configured to perform clear channel assessment CCA channel detection on the narrowband time-frequency resource to obtain a channel energy value of the narrowband time-frequency resource;

a judgment unit 1203, configured to determine whether the channel energy value is less than a preset energy threshold; and a sending unit 1204, configured to: if the channel energy value is less than the preset energy threshold, send uplink data to the base station on the narrowband time-frequency resource.

Optionally, the sending unit 1204 is further configured to send a reservation signal before reaching a preset symbol boundary of the narrowband time-frequency resource, to occupy the narrowband time-frequency resource; and the sending unit 1204 is further configured to start to send the uplink data to the base station at the preset symbol boundary of the narrowband time-frequency resource.

Optionally, the narrowband time-frequency resource includes a subframe; and the detection unit 1202 is further configured to perform CCA channel detection within a detection window of the narrowband time-frequency resource, where the detection window is a preset position in the subframe.

Optionally, the detection window is a position of the last symbol in the $N^{th}$ subframe and/or a position of the $1^{st}$ symbol in the $(N+1)^{th}$ subframe of the narrowband time-frequency resource, where N is a positive integer.

Optionally, the detection window is a position of a preset symbol in the subframe, and the preset symbol includes a plurality of detection position points; and the detection unit 1202 is further configured to perform CCA channel detection at the plurality of detection position points.

Optionally, the sending unit 1204 is further configured to send a reservation signal before reaching a preset symbol boundary of the narrowband time-frequency resource, to occupy the narrowband time-frequency resource; and the sending unit 1204 is further configured to start to send the uplink data to the base station at the preset symbol boundary of the narrowband time-frequency resource.

Optionally, the determining unit 1201 is further configured to obtain control information sent by the base station, where the control information is used to indicate, to the user equipment, the narrowband time-frequency resource scheduled by the base station; and the user equipment further includes an access judgment unit 1205, where the access judgment unit 1205 is configured to determine whether a preset quantity of pieces of control information are obtained continuously and a channel cannot be accessed; and if the preset quantity of pieces of control information are obtained continuously and a channel cannot be accessed, the detection unit 1202 performs the step of performing CCA channel detection within a detection window of the narrowband time-frequency resource.

Optionally, if the channel energy value is less than the preset energy threshold, the sending unit 1204 is further configured to: send acknowledgment information to the base station on the narrowband time-frequency resource, so that triggered by the acknowledgment information, the base station adjusts downlink power allocation for the user equipment.

Optionally, the narrowband time-frequency resource is an interlace interlace.

In conclusion, after the determining unit 1201 determines the narrowband time-frequency resource scheduled by the base station, the detection unit 1202 performs CCA channel detection on the narrowband time-frequency resource to obtain the channel energy value of the narrowband time-frequency resource. Then the judgment unit 1203 determines whether the channel energy value is less than the preset energy threshold; and if the channel energy value is less than the preset energy threshold, the sending unit 1204 sends the uplink data to the base station on the narrowband time-frequency resource. The base station schedules the narrowband time-frequency resource for the user equipment, so that the user equipment sends the uplink data on the narrowband time-frequency resource. Different user equipments may perform data transmission on different narrowband time-frequency resources. In this case, the user equipment performs CCA channel detection on the narrowband time-frequency resource scheduled for the user equipment, and when the detected channel energy value is less than the preset energy threshold, it indicates that the narrowband time-frequency resource is idle, and the uplink data can be sent. When a narrowband time-frequency resource scheduled for one user equipment is idle and there is data transmitted on another narrowband time-frequency resource of the same subframe, a channel access failure may be caused if the user equipment uses full-bandwidth CCA channel detection. In this way, an opportunity of accessing a channel by the user equipment can be increased in a manner of performing CCA channel detection on the narrowband time-frequency resource, thereby increasing uplink time-frequency resource utilization.

Figure 13:
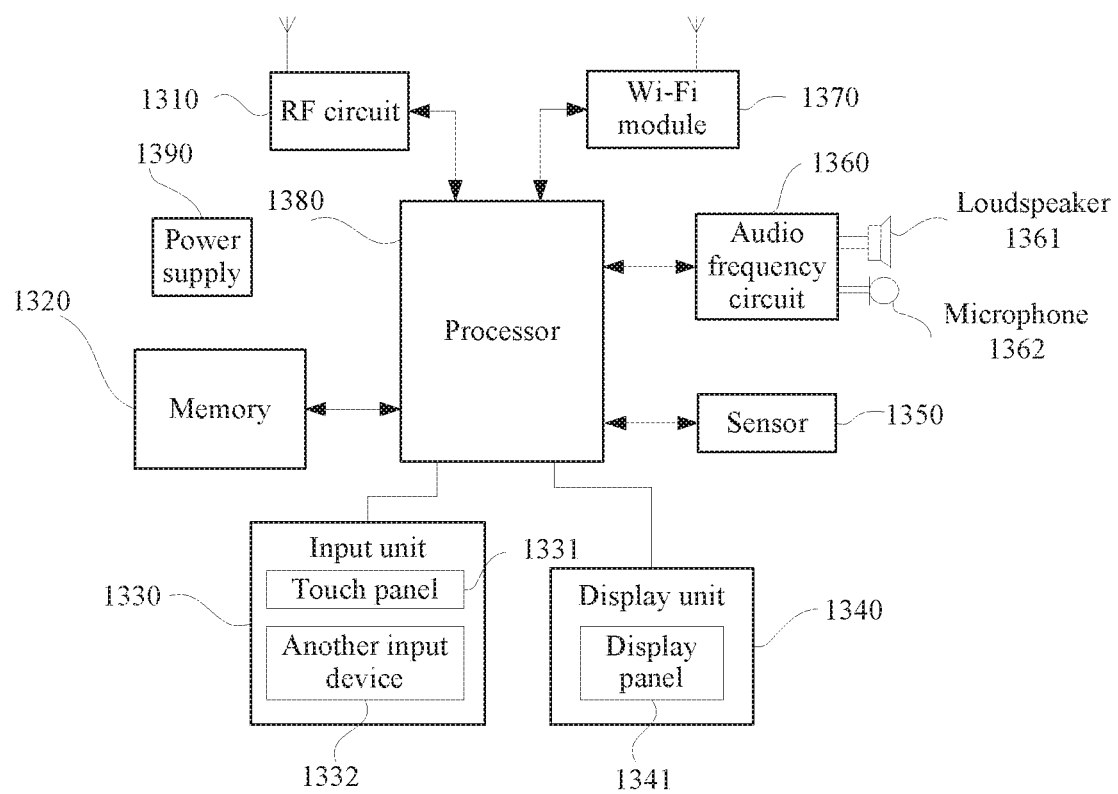
FIG. 13 is a schematic structural diagram of hardware of user equipment according to another embodiment of this application.

FIG. 13 is a schematic structural diagram of hardware of user equipment according to an embodiment of this application. The user equipment can be configured to perform the data sending methods provided in the foregoing embodiments. However, units and modules of the user equipment in the embodiment shown in FIG. 12 may be integrated into the user equipment in this embodiment of this application.

As shown in FIG. 13, for ease of description, only a part related to this embodiment of this application is shown. For specific technical details that are not disclosed, refer to the part of the method in the embodiments of this application. The user equipment may be any terminal device such as a mobile phone, a tablet computer, a PDA (Personal Digital Assistant, personal digital assistant), a POS (Point of Sales, point of sales), or an in-vehicle computer. The user equipment being a mobile phone is used as an example.

FIG. 13 is a block diagram of some structures of a mobile phone related to the user equipment provided in this embodiment of this application. Referring to FIG. 13, the mobile phone includes components such as a radio frequency (Radio Frequency, RF) circuit 1310, a memory 1320, an input unit 1330, a display unit 1340, a sensor 1350, an audio frequency circuit 1360, a Wireless Fidelity (Wireless Fidelity, Wi-Fi) module 1370, a processor 1380, and a power supply 1390. A person skilled in the art may understand that the structure of the mobile phone shown in FIG. 13 constitutes no limitation on the mobile phone, and the mobile phone may include more or fewer components than those shown in FIG. 13, combine some components, or have different component deployments.

Constituent components of the mobile phone are specifically described in the following with reference to FIG. 13.

The RF circuit 1310 may be configured to: receive and send signals in an information sending and receiving processes or a call process; and in particular, after receiving downlink information of a base station, send the downlink information to the processor 1380 for processing, and in addition, send uplink data to the base station. The RF circuit 1310 usually includes but is not limited to an antenna, at least one amplifier, a transceiver, a coupler, a low noise amplifier (Low Noise Amplifier, LNA), a duplexer, and the like. In addition, the RF circuit 1310 may also communicate with a network and other devices through wireless communication. Any communications standard or protocol may be used during wireless communication, including but not limited to Global System for Mobile Communications (Global System of Mobile communication, GSM), General Packet Radio Service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), an e-mail, a short message service (Short Messaging Service, SMS), and the like.

The memory 1320 can be configured to store a software program and module. The processor 1380 executes various function applications of the mobile phone and process data, by running the software program and module stored in the memory 1320. The memory 1320 may mainly include a program storage area and a data storage area. The program storage area may store an operating system, an application program required for at least one function (such as a sound playback function and an image playback function), and the like. The data storage area may store data (such as audio data and a phone book) created according to use of the mobile phone, and the like. In addition, the memory 1320 may include a high-speed random access memory, and may further include a non-volatile memory such as at least one disk storage device, a flash memory device, or another volatile solid-state storage device.

The input unit 1330 can be configured to receive input digital or character information, and generate key signal input related to a user setting and function control of the mobile phone. Specifically, the input unit 1330 may include a touch panel 1331 and another input device 1332. The touch panel 1331, also referred to as a touchscreen, can collect a touch operation performed by a user on or near the touch panel 1331 (for example, an operation performed on or near the touch panel 1331 by the user by using a finger, a stylus, or any other proper object or accessory), and drive a corresponding connection apparatus according to a preset program. Optionally, the touch panel 1331 may include two components: a touch detection apparatus and a touch controller. The touch detection apparatus detects a touch position of the user, detects a signal brought by a touch operation, and transfers the signal to the touch controller. The touch controller receives touch information from the touch detection apparatus, converts the touch information into contact coordinates, and sends the contact coordinates to the processor 1380, and can receive and execute a command sent by the processor 1380. In addition, the touch panel 1331 may be implemented in a plurality of types, such as a resistive type, a capacitive type, an infrared type, and a surface acoustic wave type. In addition to the touch panel 1331, the input unit 1330 may further include the another input device 1332. Specifically, the another input device 1332 may include but is not limited to one or more of a physical keyboard, a function key (such as a volume control key or an on/off key), a trackball, a mouse, and a joystick.

A display unit 1340 may be configured to display information input by the user or information provided for the user and various menus of the mobile phone. The display unit 1340 may include a display panel 1341. Optionally, the display panel 1341 may be configured in a form of a liquid crystal display (Liquid Crystal Display, LCD), an organic light-emitting diode (Organic Light-Emitting Diode, OLED), or the like. Further, the touch panel 1331 may cover the display panel 1341. After detecting a touch operation on or near the touch panel 1331, the touch panel 1331 transfers the touch operation to the processor 1380 to determine a type of a touch event. Then the processor 1380 provides corresponding visual output on the display panel 1341 according to the type of the touch event. Although in FIG. 13, the touch panel 1331 and the display panel 1341 are used as two separate components to implement input and input functions of the mobile phone, in some embodiments, the touch panel 1331 may be integrated with the display panel 1341 to implement the input and output functions of the mobile phone.

The mobile phone may further include at least one sensor 1350 such as a light sensor, a motion sensor, or another sensor. Specifically, the light sensor may include an ambient light sensor and a proximity sensor. The ambient light sensor may adjust luminance of the display panel 1341 according to brightness of ambient light. The proximity sensor may turn off the display panel 1341 and/or backlight when the mobile phone moves to an ear. As a type of motion sensor, an accelerometer sensor can detect a value of an acceleration in each direction (usually, there are three axes), can detect a value and a direction of gravity when the mobile phone is static, and can be used for identifying application of a mobile phone posture (such as switch between landscape and portrait screens, a related game, and magnetometer posture calibration), a vibration-recognition related function (such as a pedometer or a tap), and the like. A gyroscope, a barometer, a hygrometer, a thermometer, an infrared sensor, and another sensor may be further provided for the mobile phone, and details are not described herein.

An audio circuit 1360, a loudspeaker 1361, and a microphone 1362 may provide an audio interface between the user and the mobile phone. The audio circuit 1360 can transmit, to the loudspeaker 1361, an electrical signal obtained by converting received audio data, and the loudspeaker 1361 converts the electrical signal into an acoustic signal and outputs the acoustic signal. In addition, the microphone 1362 converts a collected acoustic signal into an electrical signal; the audio circuit 1360 receives the electrical signal and converts the electrical signal into audio data, and outputs the audio data to the processor 1380 for processing; and processed audio data is sent to, for example, another mobile phone through the RF circuit 1310, or audio data is output to the memory 1320 for further processing.

Wi-Fi belongs to a short-distance wireless transmission technology. By using the Wi-Fi module 1370, the mobile phone can help the user receive and send an email, browse a web page, access streaming media, and the like. The Wi-Fi module 1370 provides wireless access to the broadband Internet for the user. Although FIG. 13 shows the Wi-Fi module 1370, it can be understood that the Wi-Fi module 1370 is not a necessary constituent of the mobile phone and may be omitted well as required provided that the essence of this application is not changed.

The processor 1380 is a control center of the mobile phone, and connects various components of the entire mobile phone by using various interfaces and lines. The processor 1380 executes various functions of the mobile phone and processes data, by running or executing the software program and/or the module stored in the memory 1320, and invoking data stored in the memory 1320, so as to monitor the entire mobile phone. Optionally, the processor 1380 may include one or more processing units. Preferably, an application processor and a modem processor may be integrated in the processor 1380. The application processor mainly processes an operating system, a user interface, an application, and the like, and the modem processor mainly processes radio communication. It can be understood that the modem processor may alternatively not be integrated in the processor 1380.

The mobile phone further includes the power supply 1390 (for example, a battery) that supplies power to various components. Preferably, the power supply may be logically connected to the processor 1380 by using a power management system, so as to implement functions such as charge management, discharge management, and power consumption management by using the power management system.

Although not shown, the mobile phone may further include a camera, a Bluetooth module, and the like, and details are not described herein.

In this embodiment of this application, the processor 1380 included in the user equipment further has the following functions:

determining a narrowband time-frequency resource scheduled by the base station;

performing clear channel assessment CCA channel detection on the narrowband time-frequency resource to obtain a channel energy value of the narrowband time-frequency resource;

determining whether the channel energy value is less than a preset energy threshold; and if the channel energy value is less than the preset energy threshold, sending uplink data to the base station on the narrowband time-frequency resource.

Optionally, the processor 1380 specifically further has the following functions:

before the sending uplink data to the base station on the narrowband time-frequency resource, sending a reservation signal before reaching a preset symbol boundary of the narrowband time-frequency resource, to occupy the narrowband time-frequency resource; and starting to send the uplink data to the base station at the preset symbol boundary of the narrowband time-frequency resource.

Optionally, the narrowband time-frequency resource includes a subframe. The processor 1380 specifically further has the following functions: performing CCA channel detection within a detection window of the narrowband time-frequency resource, where the detection window is a preset position in the subframe.

Optionally, the detection window is a position of the last symbol in the $N^{th}$ subframe and/or a position of the $1^{st}$ symbol in the $(N+1)^{th}$ subframe of the narrowband time-frequency resource, where N is a positive integer.

Optionally, the detection window is a position of a preset symbol in the subframe, and the preset symbol includes a plurality of detection position points. The processor 1380 specifically further includes the following functions: performing CCA channel detection at the plurality of detection position points.

Optionally, the processor 1380 specifically further has the following functions:

before the sending uplink data to the base station on the narrowband time-frequency resource, sending a reservation signal before reaching a preset symbol boundary of the narrowband time-frequency resource, to occupy the narrowband time-frequency resource; and starting to send the uplink data to the base station at the preset symbol boundary of the narrowband time-frequency resource.

Optionally, the processor 1380 specifically further has the following functions:

obtaining control information sent by the base station, where the control information is used to indicate, to the user equipment, the narrowband time-frequency resource scheduled by the base station; and before the performing CCA channel detection within a detection window of the narrowband time-frequency resource, determining whether a preset quantity of pieces of control information are obtained continuously and a channel cannot be accessed; and if the preset quantity of pieces of control information are obtained continuously and a channel cannot be accessed, performing the step of performing CCA channel detection within a detection window of the narrowband time-frequency resource.

Optionally, the processor 1380 specifically further has the following functions:

if the channel energy value is less than the preset energy threshold, sending acknowledgment information to the base station on the narrowband time-frequency resource, so that triggered by the acknowledgment information, the base station adjusts downlink power allocation for the user equipment.

Optionally, the narrowband time-frequency resource is an interlace interlace.

In conclusion, after the processor 1380 determines the narrowband time-frequency resource scheduled by the base station, the processor 1380 performs CCA channel detection on the narrowband time-frequency resource to obtain the channel energy value of the narrowband time-frequency resource. Then the processor 1380 determines whether the channel energy value is less than the preset energy threshold; and if the channel energy value is less than the preset energy threshold, the processor 1380 sends the uplink data to the base station on the narrowband time-frequency resource. The base station schedules the narrowband time-frequency resource for the user equipment, so that the user equipment sends the uplink data on the narrowband time-frequency resource. Different user equipments may perform data transmission on different narrowband time-frequency resources. In this case, the user equipment performs CCA channel detection on the narrowband time-frequency resource scheduled for the user equipment, and when the detected channel energy value is less than the preset energy threshold, it indicates that the narrowband time-frequency resource is idle, and the uplink data can be sent. When a narrowband time-frequency resource scheduled for one user equipment is idle and there is data transmitted on another narrowband time-frequency resource of the same subframe, a channel access failure may be caused if the user equipment uses full-bandwidth CCA channel detection. In this way, an opportunity of accessing a channel by the user equipment can be increased in a manner of performing CCA channel detection on the narrowband time-frequency resource, thereby increasing uplink time-frequency resource utilization.

All or some of the foregoing embodiments may be implemented by using software, hardware, firmware, or any combination thereof. When being implemented by using software, all or some of the embodiments may be implemented in a form of a computer program product.

The computer program product includes one or more computer instructions. When the computer program instruction is loaded and runs on a computer, all or some of procedures or functions described in the embodiments of this application are generated. The computer may be a general purpose computer, a dedicated computer, a computer network, or another programmable apparatus. The computer instruction may be stored in a computer readable storage medium, or may be transmitted from a computer readable storage medium to another computer readable storage medium. For example, the computer instruction may be transmitted from a website, a computer, a server, or a data center to another website, computer, server, or data center in a wired (for example, a coaxial cable, an optical fiber, a digital subscriber line (DSL)) manner, or a wireless (for example, infrared, radio, or microwave) manner. The computer readable storage medium may be any available medium that can be stored by the computer, or may be a data storage device including a server, a data center, or the like integrated with one or more available media. The available medium may be a magnetic medium (for example, a floppy disk, a hardware disk, or a magnetic tape), an optical medium (for example, DVD), a semiconductor medium (for example, disk Solid State Disk (SSD)), or the like.

What is claimed is:

1. A data sending method, implemented by an apparatus, the method comprising:
   determining an interlace scheduled for the apparatus, wherein the interlace is within a bandwidth;
   performing clear channel assessment (CCA) channel detection on the interlace without performing CCA channel detection on any other portion of the bandwidth to obtain a channel energy value for the interlace;
   determining whether the channel energy value is less than a preset energy threshold; and
   sending uplink data to a base station on the interlace in response to the channel energy value for the interlace being less than the preset energy threshold.

2. The data sending method of claim 1, wherein before sending the uplink data to the base station, the method further comprises sending a reservation signal before reaching a preset symbol boundary of the interlace to occupy the interlace, and wherein sending the uplink data to the base station comprises sending the uplink data to the base station at the preset symbol boundary of the interlace.

3. The data sending method of claim 1, wherein the comprises a subframe, wherein performing the CCA channel detection on the interlace comprises performing the CCA channel detection within a detection window of the interlace, and wherein the detection window is a preset position in the subframe.

4. The data sending method of claim 3, wherein the detection window is either a position of a last symbol in an $N^{th}$ subframe or a position of a first symbol in an $(N+)^{th}$ subframe of the interlace, and wherein N is a positive integer.

5. The data sending method of claim 3, wherein the detection window is a position of a preset symbol in the subframe, wherein the preset symbol comprises a plurality of detection position points, and wherein performing the CCA channel detection within the detection window of the interlace comprises performing the CCA channel detection at the plurality of detection position points.

6. The data sending method of claim 3, wherein before sending the uplink data to the base station on the interlace, the method further comprises sending a reservation signal before reaching a preset symbol boundary of the interlace to occupy the interlace, and wherein sending the uplink data to the base station on the interlace comprises sending the uplink data to the base station at the preset symbol boundary of the interlace.

7. The data sending method of claim 3, wherein determining the interlace comprises obtaining control information from the base station, wherein the control information indicates, to user equipment, the interlace, wherein before performing the CCA channel detection within the detection window of the interlace, the method further comprises determining whether a preset quantity of pieces of the control information are obtained continuously and whether a channel cannot be accessed, and wherein performing the CCA channel detection comprises performing the CCA channel detection within the detection window of the interlace when the preset quantity of pieces of the control information are obtained continuously and the channel cannot be accessed.

8. The data sending method of claim 7, wherein when the channel energy value is less than the preset energy threshold, the method further comprises sending acknowledgment information to the base station on the interlace in response to the channel energy value being less than the preset energy threshold to trigger adjustment of downlink power allocation for the user equipment.

9. The data sending method of claim 1, wherein the bandwidth is twenty megahertz (MHz), and wherein the interlace comprises one or more non-contiguous resource blocks.

10. An apparatus, comprising:
    a processor configured to:
        determine an interlace scheduled for the apparatus, wherein the interlace is within a bandwidth;
        perform clear channel assessment (CCA) channel detection on the interlace without performing CCA channel detection on any other portion of the bandwidth to obtain a channel energy value of the interlace; and
        determine whether the channel energy value is less than a preset energy threshold; and
    a transceiver coupled to the processor and configured to send uplink data to a base station on the interlace in response to the channel energy value being less than the preset energy threshold.

11. The apparatus of claim 10, wherein the transceiver is further configured to:
    send a reservation signal before reaching a preset symbol boundary of the interlace to occupy the interlace; and
    send the uplink data to the base station at the preset symbol boundary of the interlace.

12. The apparatus of claim 10, wherein the interlace comprises a subframe, wherein the processor is further configured to perform the CCA channel detection within a detection window of the interlace, and wherein the detection window is a preset position in the subframe.

13. The apparatus of claim 12, wherein the detection window is either a position of a last symbol in an $N^{th}$ subframe or a position of a first symbol in an $(N+1)^{th}$ subframe of the interlace, and wherein N is a positive integer.

14. The apparatus of claim 12, wherein the detection window is a position of a preset symbol in the subframe, wherein the preset symbol comprises a plurality of detection position points, and wherein the processor is further configured to perform the CCA channel detection at the plurality of detection position points.

15. The apparatus of claim 12, wherein the transceiver is further configured to:
 send a reservation signal before reaching a preset symbol boundary of the interlace to occupy the interlace; and
 send the uplink data to the base station at the preset symbol boundary of the interlace.

16. The apparatus of claim 12, wherein the processor is further configured to:
 obtain control information from the base station, wherein the control information indicates the interlace;
 determine whether a preset quantity of pieces of the control information are obtained continuously and whether a channel cannot be accessed; and
 perform the CCA channel detection within the detection window of the interlace when the preset quantity of pieces of the control information are obtained continuously and the channel cannot be accessed.

17. The apparatus of claim 16, wherein the transceiver is further configured to send acknowledgment information to the base station on the interlace in response to the channel energy value being less than the preset energy threshold to trigger adjustment of downlink power allocation for the user equipment.

18. The apparatus of claim 10, wherein the interlace comprises non-contiguous resource blocks.

19. The apparatus of claim 10, wherein the apparatus is either user equipment or a chip which can be applied in the user equipment.

20. A computer program product comprising computer-executable instructions stored on a non-transitory computer-readable medium that, when executed by a processor, cause an apparatus to:
 determine an interlace scheduled for the apparatus, wherein the interlace is within a bandwidth;
 perform clear channel assessment (CCA) channel detection on the without performing CCA channel detection on any other portion of the bandwidth to obtain a channel energy value of the interlace;
 determine whether the channel energy value is less than a preset energy threshold; and
 send uplink data to a base station on the interlace in response to the channel energy value being less than the preset energy threshold.

* * * * *

UNITED STATES PATENT AND TRADEMARK OFFICE
CERTIFICATE OF CORRECTION

PATENT NO. : 11,071,143 B2
APPLICATION NO. : 16/488804
DATED : July 20, 2021
INVENTOR(S) : Xiaocui Li and Kai Xu Page 1 of 1

It is certified that error appears in the above-identified patent and that said Letters Patent is hereby corrected as shown below:

In the Claims

Claim 3, Column 27, Line 55: "comprises a subframe" should read "interlace comprises a subframe"

Claim 4, Column 27, Line 62: "in an (N+$^{th}$" should read "in an (N+1)$^{th}$"

Claim 20, Column 30, Line 18: "on the without" should read "on the interlace without"

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*